United States Patent
Lee et al.

(10) Patent No.: US 12,349,007 B2
(45) Date of Patent: Jul. 1, 2025

(54) APPARATUS AND METHOD FOR CONTROLLING BITRATE IN MOBILE COMMUNICATION NETWORK

(71) Applicant: Samsung Electronics Co., Ltd., Suwon-si (KR)

(72) Inventors: Hakju Lee, Suwon-si (KR); Kyunghun Jung, Suwon-si (KR); Sunghee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 394 days.

(21) Appl. No.: 17/788,056

(22) PCT Filed: Jan. 26, 2021

(86) PCT No.: PCT/KR2021/001022
§ 371 (c)(1),
(2) Date: Jun. 22, 2022

(87) PCT Pub. No.: WO2021/157936
PCT Pub. Date: Aug. 12, 2021

(65) Prior Publication Data
US 2023/0052541 A1 Feb. 16, 2023

(30) Foreign Application Priority Data
Feb. 7, 2020 (KR) .................. 10-2020-0015137

(51) Int. Cl.
*H04W 28/12* (2009.01)
*H04W 28/22* (2009.01)
(52) U.S. Cl.
CPC ........... *H04W 28/12* (2013.01); *H04W 28/22* (2013.01)

(58) Field of Classification Search
CPC .................................................... H04W 28/22
See application file for complete search history.

(56) References Cited

U.S. PATENT DOCUMENTS

| 9,860,290 | B2 | 1/2018 | Oyman | |
| 2011/0294491 | A1* | 12/2011 | Fong | H04L 5/0053 455/422.1 |
| 2014/0247722 | A1 | 9/2014 | Furbeck et al. | |
| 2019/0037001 | A1 | 1/2019 | Fujishiro et al. | |
| 2019/0215729 | A1* | 7/2019 | Oyman | H04L 65/1016 |
| 2019/0373511 | A1 | 12/2019 | Oyman et al. | |
| 2020/0045587 | A1* | 2/2020 | Choi | H04W 28/22 |

FOREIGN PATENT DOCUMENTS

| WO | 2017-172449 A1 | 10/2017 | |
| WO | WO-2018144928 A1 * | 8/2018 | ........ H04W 28/0268 |

OTHER PUBLICATIONS

Qualcomm Incorporated, 'Recommended Bit Rate/Query for FLUS and MTSI', R2-1915712, 3GPP TSG-RAN2 Meeting #108, Nov. 8, 2019, Reno, USA.

* cited by examiner

*Primary Examiner* — James P Duffy
(74) *Attorney, Agent, or Firm* — Jefferson IP Law, LLP

(57) ABSTRACT

Provided is a method of controlling a bitrate of a user equipment (UE), the method including: receiving bitrate control information from a base station (BS); changing a bitrate by a value determined based on the bitrate control information; transmitting, to the BS, information notifying that the bitrate has been changed; and communicating with another UE at the changed bitrate.

20 Claims, 29 Drawing Sheets

FIG. 7

| LCID | | U/D | BR | | |
|---|---|---|---|---|---|
| BR (cont.) | R | R | R | R | R |

FIG. 8

| Index | Recommended Bit Rate value [kbit/s] | Index | Recommended Bit Rate value [kbit/s] |
|---|---|---|---|
| 0 | Note 1 | 32 | 700 |
| 1 | 0 | 33 | 800 |
| 2 | 8 | 34 | 900 |
| 3 | 10 | 35 | 1000 |
| 4 | 12 | 36 | 1100 |
| 5 | 16 | 37 | 1200 |
| 6 | 20 | 38 | 1300 |
| 7 | 24 | 39 | 1400 |
| 8 | 28 | 40 | 1500 |
| 9 | 32 | 41 | 1750 |
| 10 | 36 | 42 | 2000 |
| 11 | 40 | 43 | 2250 |
| 12 | 48 | 44 | 2500 |
| 13 | 56 | 45 | 2750 |
| 14 | 72 | 46 | 3000 |
| 15 | 88 | 47 | 3500 |
| 16 | 104 | 48 | 4000 |
| 17 | 120 | 49 | 4500 |
| 18 | 140 | 50 | 5000 |
| 19 | 160 | 51 | 5500 |
| 20 | 180 | 52 | 6000 |
| 21 | 200 | 53 | 6500 |
| 22 | 220 | 54 | 7000 |
| 23 | 240 | 55 | 7500 |
| 24 | 260 | 56 | 8000 |
| 25 | 280 | 57 | Reserved |
| 26 | 300 | 58 | Reserved |
| 27 | 350 | 59 | Reserved |
| 28 | 400 | 60 | Reserved |
| 29 | 450 | 61 | Reserved |
| 30 | 500 | 62 | Reserved |
| 31 | 600 | 63 | Reserved |

Note1: For bit rate recommendation message this index is used for indicating that no recommendation on bit rate is given.

FIG. 10

| LCID | | U/D | BR |
|---|---|---|---|
| BR (cont.) | R | R | R |

FIG. 19

| LCID | | U/D | BR |
|---|---|---|---|
| BR (cont.) | +/− | M/A | R/A |
| Request ID | | | |

FIG. 25

| 8 | 7 | 6 | 5 | 4 | 3 | 2 | 1 | |
|---|---|---|---|---|---|---|---|---|
| Quality of Service IEI ||||||||1|
| Length of QoS IE ||||||||  |
| Spare (0 0) | | Delay Class ||| Reliability Class |||  |
| Peak Throughput |||| Spare (0) | Precedence Class |||  |
| Spare (0 0 0) ||| Delivery Order || Delivery of Erroneous SDU |||6|
| Maximum SDU Size ||||||||  |
| Maximum Bit-Rate for Uplink ||||||||  |
| Maximum Bit-Rate for Downlink ||||||||  |
| Residual BER |||| Transfer Delay ||| Traffic Handling Priority |11|
| Guaranteed Bit-Rate for Uplink ||||||||  |
| Guaranteed Bit-Rate for Downlink ||||||||  |
| Spare (0 0 0) ||| SI || Source Statistics Descriptor |||  |
| Maximum Bit-Rate for Downlink (Extended) ||||||||16|
| Guaranteed Bit-Rate for Downlink (Extended) ||||||||  |
| Maximum Bit-Rate for Uplink (Extended) ||||||||  |
| Guaranteed Bit-Rate for Uplink (Extended) ||||||||  |

APPARATUS AND METHOD FOR CONTROLLING BITRATE IN MOBILE COMMUNICATION NETWORK

TECHNICAL FIELD

The disclosure relates to an apparatus and method for controlling a bitrate in a mobile communication network, and more particularly, to an apparatus and method for controlling a bitrate of a user equipment for transmitting or receiving media in a mobile communication network to efficiently use limited transmission bandwidth.

BACKGROUND ART

Mobile communication networks have a limited capacity and physically limited radio frequency resources due to the long time required to build various wired or wireless infrastructures and huge investment costs. For example, many user equipments in a dense area may simultaneously make connections to a mobile communication network to use call services or Internet services or attempt to download data or use media streaming services. At this time, however, when the network is running low on capacity, users may not be able to properly use desired services.

This network overload may occur at rush hour in big cities or in an event packed with many people in a narrow space. When phone traffic increases rapidly, a radio network controller (RNC) for controlling base stations in a circuit-switched third generation (3G) (e.g., wideband code division multiple access (W-CDMA)) network reduces bitrates of speech codecs equipped in the user equipment and the network to overcome communication disorder caused by the network overload. The speech bitrate, which has been temporarily reduced, of each user equipment may be gradually increased when the network has adequate capacity.

DISCLOSURE OF INVENTION

Technical Problem

An accurate bitrate control method is required for efficient management of radio resources of a mobile communication network.

Solution to Problem

Provided is a method of controlling a bitrate of a user equipment (UE), the method including: receiving bitrate control information from a base station (BS); changing a bitrate by a value determined based on the bitrate control information; transmitting, to the BS, information notifying that the bitrate has been changed; and communicating with another UE at the changed bitrate.

BRIEF DESCRIPTION OF DRAWINGS

The above and other aspects, features, and advantages of certain embodiments of the disclosure will be more apparent from the following description taken in conjunction with the accompanying drawings, in which:

FIG. 7 illustrates a recommended bitrate medium access control (MAC) control element (CE) generated by a MAC protocol of an LTE mobile communication system;

FIG. 8 illustrates indexes given for recommended bitrate values;

FIG. 10 illustrates a recommended bitrate MAC CE generated by a MAC protocol of a general 5G mobile communication system;

FIG. 19 illustrates a recommended bitrate MAC CE, according to an embodiment of the disclosure;

FIG. 25 illustrates an information element used to notify a QoS value from a UE or a network node, according to an embodiment of the disclosure;

BEST MODE FOR CARRYING OUT THE INVENTION

Figure 1:
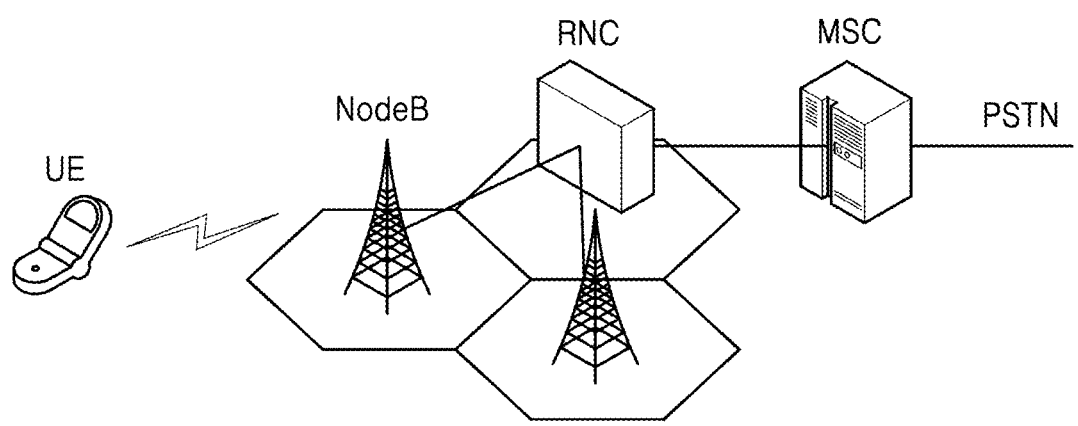
FIG. 1 illustrates a structure of a third generation (3G) mobile communication network.

Additional aspects will be set forth in part in the description which follows and, in part, will be apparent from the description, or may be learned by practice of the presented embodiments of the disclosure.

According to an embodiment of the disclosure, a method of controlling a bitrate of a user equipment (UE) includes: receiving, from a base station (BS), bitrate control information; changing a bitrate by a value determined based on the bitrate control information; transmitting, to the BS, information notifying that the bitrate has been changed; and communicating with another UE at the changed bitrate.

According to an embodiment of the disclosure, a method of controlling a bitrate of a BS includes: determining whether a change in bitrate is required based on a network load condition; transmitting to a UE a bitrate control information requesting to change a bitrate by a certain value, based on a result of the determining; and receiving, from the UE, information notifying that the bitrate has been changed based on the bitrate control information.

According to an embodiment of the disclosure, a UE communicating with another UE over a mobile communication network includes: a communication module configured to receive bitrate control information from a BS; and a processor configured to change a bitrate by a value determined based on the bitrate control information, wherein the communication module is further configured to transmit, to the BS, information notifying that the bitrate has been changed, and communicate with another UE at the changed bitrate.

According to an embodiment of the disclosure, a BS connected to a UE so as to support mobile communication of the UE includes: a processor configured to determine whether a change in bitrate is required, based on a network load condition; and a communication module configured to transmit, to the UE, bitrate control information requesting to change a bitrate by a certain value based on a result of the determining, and receive, from the UE, information notifying that the bitrate has been changed based on the bitrate control information.

According to an embodiment of the disclosure, a computer-readable recording medium having recorded thereon one or more programs including instructions for carrying out the method of controlling a bitrate of a UE, the method including: receiving bitrate control information from a BS; changing a bitrate by a value determined based on the bitrate control information; transmitting, to the BS, information notifying that the bitrate has been changed; and communicating with another UE at the changed bitrate.

According to an embodiment of the disclosure, a computer-readable recording medium having recorded thereon one or more programs including instructions for carrying out the method of controlling a bitrate of a BS, the method including: determining whether a change in bitrate is required based on a network load condition; transmitting to a UE a bitrate control information requesting to change a bitrate by a certain value, based on a result of the determining; and receiving, from the UE, information notifying that the bitrate has been changed based on the bitrate control information.

MODE FOR THE INVENTION

Embodiments of the disclosure will now be described with reference to accompanying drawings to assist those of ordinary skill in the art in readily implementing them. However, the embodiments of the disclosure may be implemented in many different forms, and are not limited to those as will be discussed herein. In the drawings, parts unrelated to the description are omitted for clarity, and like numerals refer to like elements throughout the specification.

The terms are selected as common terms widely used now, taking into account principles of the disclosure, which may however depend on intentions of those of ordinary skill in the art, judicial precedents, emergence of new technologies, and the like. Therefore, the terms should not only be construed by their names, but should be defined based on their meanings and descriptions throughout the disclosure.

Terms like 'first', 'second', etc., may be used to indicate various components, but the components should not be restricted by the terms. These terms are used to distinguish one element, component, region, layer or section from another region, layer or section.

The terminology as used herein is only used for describing particular embodiments of the disclosure and not intended to limit the disclosure. It is to be understood that a singular expression include plural expressions unless the context clearly dictates otherwise. When A is expressed to "be connected" to B, it means to be "directly connected" to B or "electrically connected" to B with C located between A and C. The term "include (or including)" or "comprise (or comprising)" is inclusive or open-ended and does not exclude additional, unrecited elements or method steps, unless otherwise mentioned.

Throughout the specification, "the" and the similar term are used to denote a thing or things already mentioned or assumed to be common knowledge. Operations for describing a method according to the disclosure may be performed in a suitable order unless the context clearly dictates otherwise. The disclosure is not, however, limited to the described order of the operations.

Expressions such as 'in an embodiment of the disclosure' or similar expressions often mentioned throughout the specification are not intended to indicate the same embodiment.

An embodiment of the disclosure may be described in terms of functional block elements and various processing operations. Some or all of the functional blocks may be implemented by any number of hardware and/or software components configured to perform the specified functions. For example, the functional blocks may be implemented by one or more microprocessors or circuit elements having dedicated functions. Furthermore, for example, the functional blocks may be implemented in various programming or scripting languages. The functional blocks may be implemented in algorithms executed on one or more processors. Moreover, the disclosure may employ any number of general techniques for electronic configuration, signal processing and/or data processing.

Connecting lines or members between the elements illustrated in the accompanying drawings are illustratively shown as functional and/or physical connections or circuit connections. In practice, functional, physical, or circuit connections that may be replaced or added may be employed between the elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

FIG. 1 illustrates a structure of a third generation (3G) mobile communication network.

In FIG. 1, the structure of the 3G mobile communication network includes a UE, a base station (BS), e.g., NodeB, a radio network controller (RNC), and a mobile switching center (MSC). The 3G mobile communication network is connected to another mobile communication network and a public switched telephone network (PSTN). In the 3G mobile communication network, speech is compressed and reconstructed by adaptive multi-rate (AMR) codecs installed in the UE and the MSC, and the AMR codec provides bidirectional call services. In this case, the RNC may control call bitrates of the speech codecs in real time, which are installed in the UE and the MSC, using a codec ode control (CMC) message.

Figure 2:
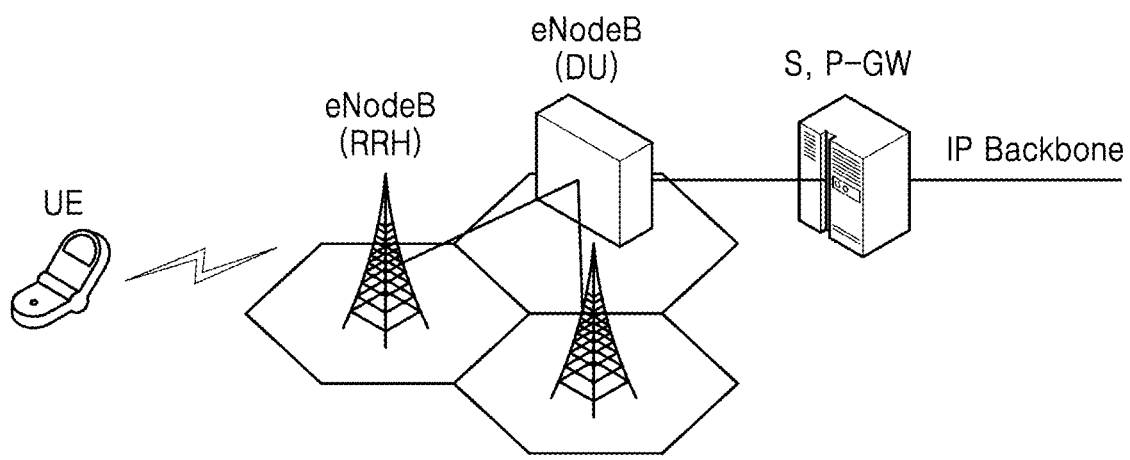
FIG. 2 illustrates a structure of a long term evolution (LTE) mobile communication network.

However, after introduction of a packet switched network in the fourth generation (4G), the speech codec is located only in the UE. Hence, a compressed speech frame is not reconstructed by a BS or a network node located in the middle of a transmission path but transmitted to and reconstructed by the other UE. FIG. 2 illustrates a structure of a 4G (e.g., long term evolution (LTE)) network.

Referring to FIG. 2, a speech codec is installed in the UE and not in the BS, e.g., eNodeB, nor a core network node, e.g., a serving gateway (S-GW) or a packet data network gateway (P-GW). Hence, the eNodeB or the core network node may not directly control the speech codec of the UE nor even identify a type of the codec used for the call.

To overcome this structural limit, as a scheme for a network to indirectly control a bitrate of a media codec installed in a UE, an explicit congestion notification (ECN) function and a RAN-assisted codec adaptation function were introduced, but have not yet achieved a performance goal.

Figure 3:
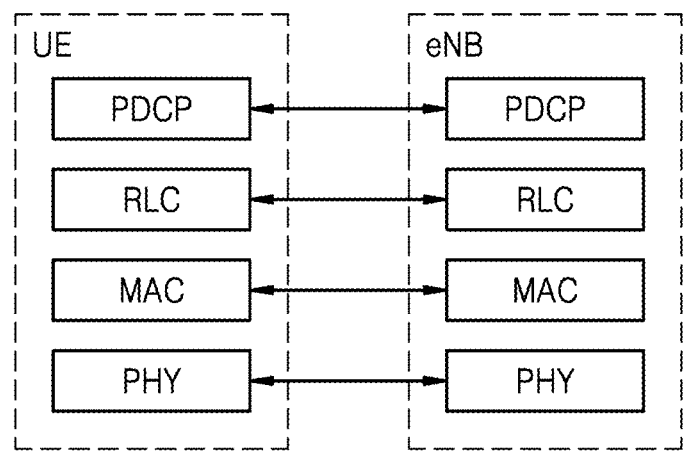
FIG. 3 illustrates a user plane protocol architecture of an LTE mobile communication network.

FIG. 3 illustrates a user plane (UP) protocol architecture used for transmission of a speech or video frame compressed in a phone call using an LTE network, e.g., a voice over LTE (VoLTE).

The UP protocol architecture of FIG. 3 includes a packet data convergence protocol (PDCP) layer, a radio link control (RLC) layer, a media access control (MAC) layer, and a physical (PHY) layer.

Figure 4:
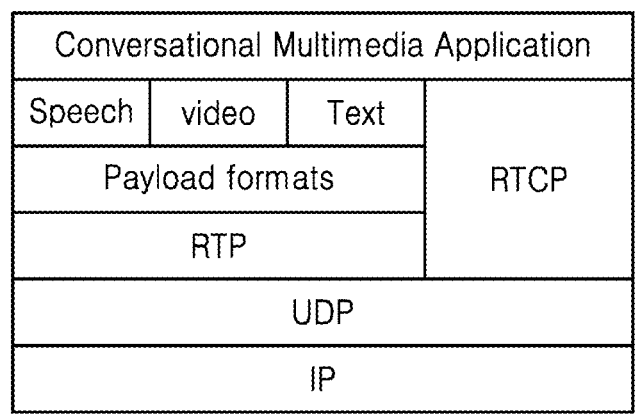
FIG. 4 illustrates a speech codec, video codec, and real-time transport protocol (RTP)/user datagram protocol (UDP)/Internet protocol (IP) protocol architecture of user equipment (UE) that supports LTE.

FIG. 4 illustrates a speech codec, video codec, and real-time transport protocol (RTP)/user datagram protocol (UDP)/Internet protocol (IP) protocol architecture of UE that supports VoLTE.

An IP layer located at the bottom of the protocol architecture of FIG. 4 is connected to the PDCP at the top of the protocol architecture shown in FIG. 3. In this case, the UE adds RTP/UDP/IP headers to a media frame compressed by the speech codec and/or the video codec and transmits the resultant frame to the other UE over the LTE network. Furthermore, the UE receives a media packet compressed and transmitted by the other UE and reconstructs the media.

The ECN introduced for a network to control the media bitrate of the UE is a scheme to indicate in an IP header of the media packet that passes the PDCP that overload of the network is imminent or that the network has been restored from an overload state. Upon reception of the packet, the UE may refer to information of the IP header to control compression bitrate of its own speech codec and/or video codec or request the other UE to control media compression bitrate of a codec in the other UE.

Figure 5:
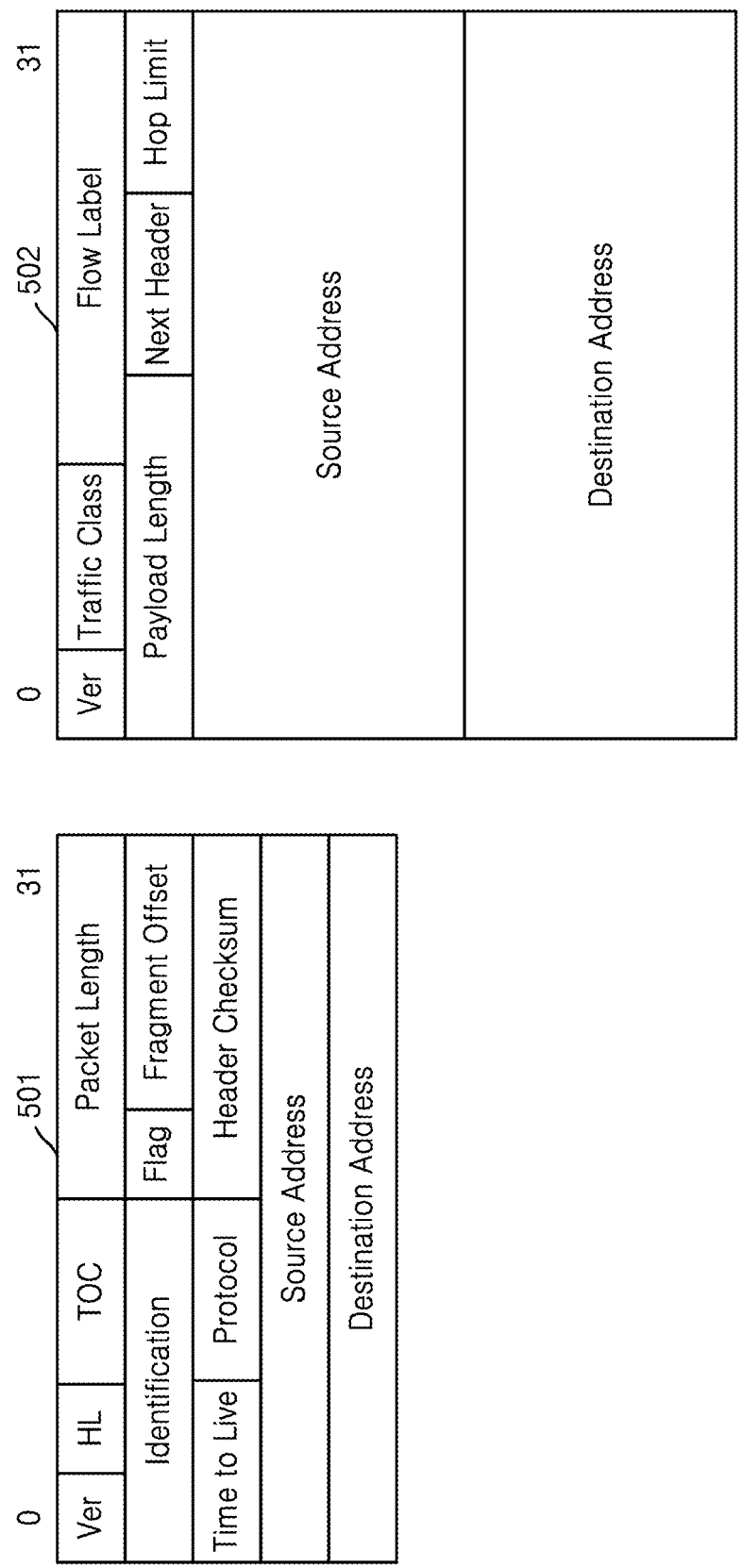
FIG. 5 illustrates a header structure of an IP protocol of UE that supports LTE.
Figure 6:
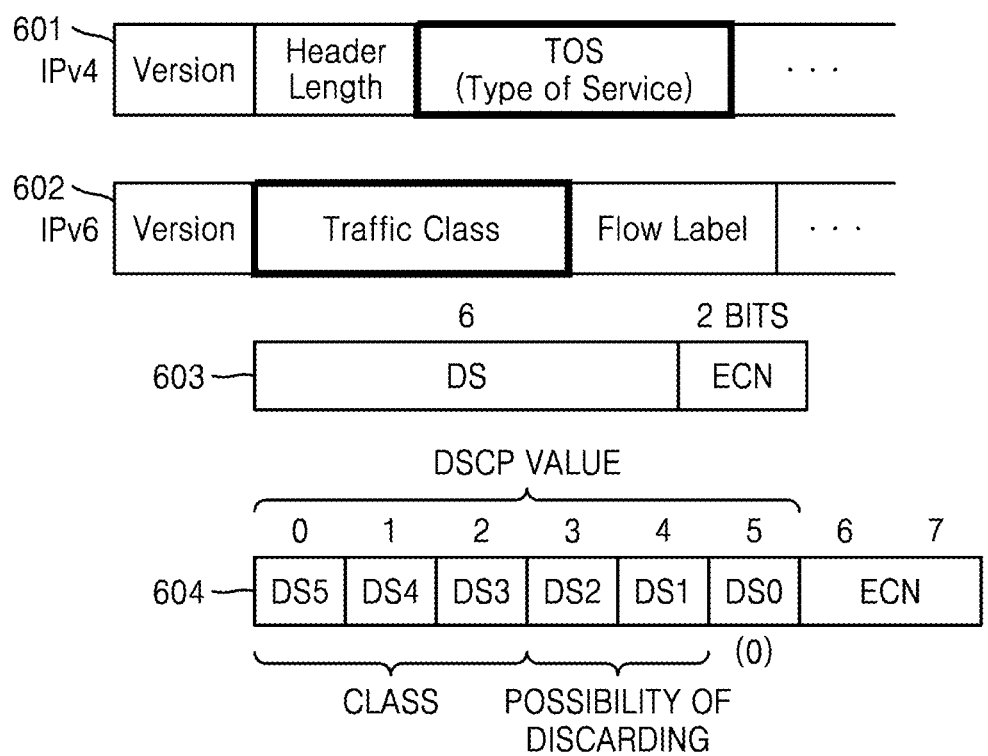
FIG. 6 illustrates fields in a header of an IP protocol, which indicate network conditions.

FIG. 5 illustrates a header structure of an IP protocol of a UE that supports LTE, and FIG. 6 illustrates fields indicating network conditions in a header of an IP protocol.

In FIG. 5, a structure 501 corresponds to a header structure of an IPv4 protocol, and a structure 502 corresponds to a header structure of an IPv6 protocol. As shown in a header 601 of FIG. 6, for the IPv4, network condition information may be indicated in two bits of a table of contents (TOC) field 603 to support the ECN function. As shown in a header 602 of FIG. 6, for the IPv6, network condition information may be indicated in two bits of a traffic class field 604 to support the ECN function.

For example, when the two bit value of the field is 00, it may mean that the ECN function is not used. When the two bit value of the field is 10 or 01, it may mean that the ECN function is supported but the load level of packet transmission and reception in the current network is normal. When the two bit value of the field is 11, it may mean that the ECN function is supported but the load level of the network is not normal, which may mean that it might be hard to maintain the current bitrate. The ECN function may be used even in 5G. A 5G network structure results from modification of the network structure of FIG. 2, i.e., from eNode B and {S, P-GW} to gNB and {User Plane Function (UPF), Data Network (DN)}.

As shown in FIGS. 5 and 6, the two bits allocated for the ECN function for IPv4 and IPv6 may only convey information about whether there is a network load, so information to be conveyed to the UE is limited. A transmission condition or a requested operation in particular may not be represented in numerical values, so it is not possible to request each UE to control the media bitrate to a level desired by the network. To solve this problem, a RAN-assisted codec adaptation function may be used.

Figure 7:
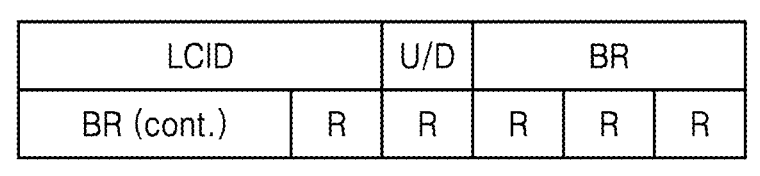

FIG. 7 illustrates a recommended bitrate MAC control element (CE) used for the RAN-assisted codec adaptation function. The recommended bitrate MAC CE may be generated by the LTE MAC protocol.

A data structure of the recommended bitrate MAC CE in two bytes may be added to a header of a MAC protocol data unit (PDU) transmitted by the UE to an eNodeB and used to ask the eNodeB about a bitrate available to the UE. Alternatively, the 2-byte data structure of the recommended bitrate MAC CE may be used by the eNodeB to recommend the UE to keep a maximum value of the bitrate of the UE under a certain level.

In the recommended bitrate MAC CE shown in FIG. 7, a 4-bit logical channel ID (LCID) field may be used to identify a logical channel to be subjected to bitrate control. A 1-bit U/D field may be used to identify a transmission direction in which a change in bitrate is to be made.

For example, when the U/D field has a value of 1, it may indicate uplink, and when the U/D field has a value of 0, it may indicate downlink. A 6-bit bitrate (BR) field may indicate a value of a bitrate recommended to the UE. The BR field may represent 0 to 63 in binary, which may indicate 8 to 8000 kbps as shown in a table of FIG. 8.

FIG. 8 illustrates the table defined for LTE MAC, and a similar table may be defined for MAC of the 5G radio communication technology, i.e., new radio (NR).

For example, when the BR field in the recommended bitrate MAC CE has a value of 011110, it may indicate a recommended bitrate of 500 kbps corresponding to index 30 in the table of FIG. 8. It may thus be interpreted as meaning a 5G BS, which is a gNB, is able to allocate up to 500 kbps for the UE. 'R' in the data structure of FIG. 7 refers to a reserved bit.

Figure 9A:
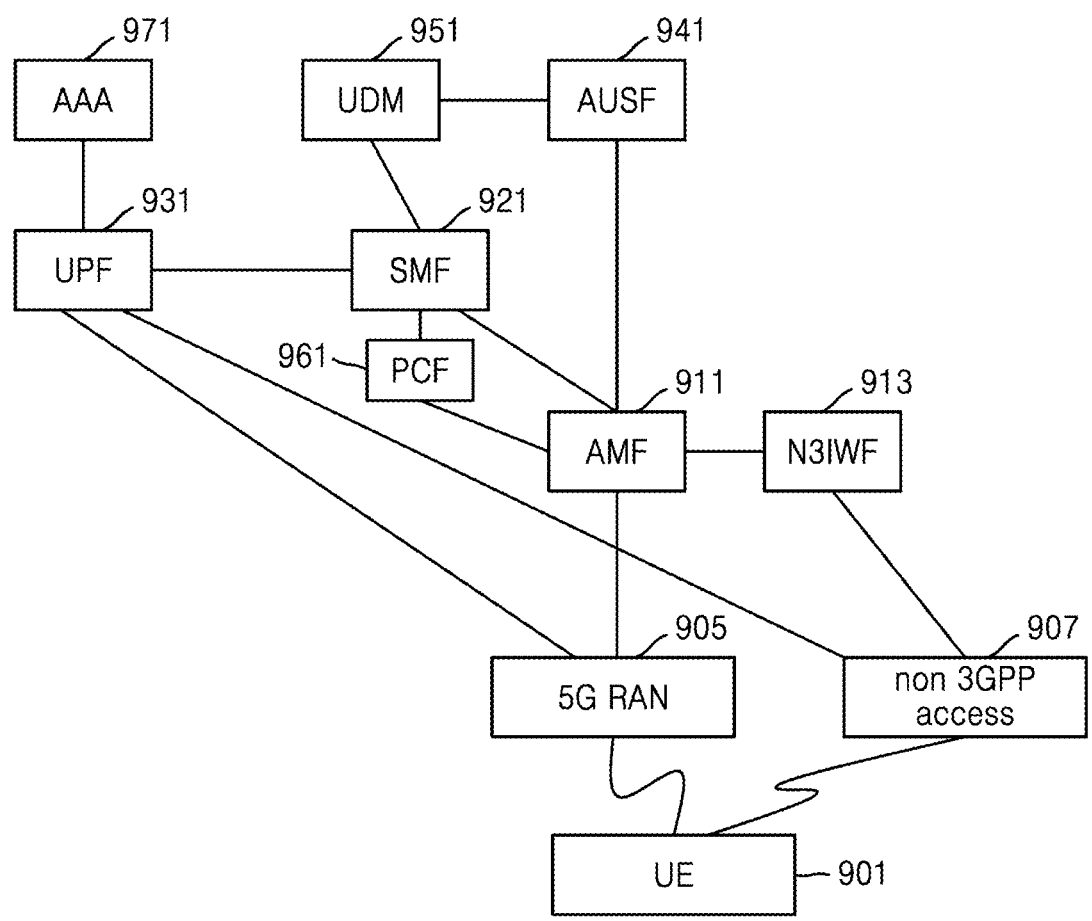
FIG. 9a illustrates a fifth generation (5G) (new radio (NR)) mobile communication network environment, according to an embodiment of the disclosure.

FIG. 9a illustrates a UE and a network environment for communication in private and public networks in a 5G or NR network, according to an embodiment of the disclosure.

Referring to FIG. 9a, a 5G or NR core network may include network functions (NFs) such as an access and mobility management function (AMF) 911, a session management function (SMF) 921, a user plane function (UPF) 931, a user data management (UDM) 951, a policy control function (961), and the like.

The AMF 911 is an NF for managing mobility of the UE. The SMF 921 is an NF for managing a packet data network connection provided for the UE. The connection is called by the name of protocol data unit (PDU) session. The UPF 931 serves as a gateway to forward a packet transmitted or received by the UE. The UPF 931 may be connected to a data network (DN) for serving to forward a data packet generated from the 5G system to the external DN connected to e.g., the Internet, to route a data packet transmitted from the UE to the Internet. The UDM 951 is an NF for storing and managing information about subscribers. The PCF 961 is an NF to apply a mobile network operator's service policy, charging policy, and PDU session policy to the UE.

Furthermore, to authenticate these entities, the 5G or NR core network may include such entities as an authentication server function (AUSF) entity 941 and an authentication, authorization and accounting (AAA) entity 971.

The UE 901 may be connected to the 5G core network through a BS, e.g., 5G RAN (or gNB) 905. Furthermore, there may be an N3 interworking function (N3IWF) 913 in case that the UE 901 performs communication through non 3GPP access 907, in which case session management may be controlled by the UE 901, the non 3GPP access 907, the N3IWF 913, and the SMF 921, and mobility management may be controlled by the UE 901, the non 3GPP access 907, the N3IWF 913, and the AMF 911.

In the 5G or NR system, an entity to perform mobility management and session management is divided into the AMF 911 and the SMF 921. In the meantime, for the 5G or NR system, a standalone deployment structure that performs communication only with 5G or NR entities and a non-standalone deployment structure that uses both the 4G entity and the 5G or NR entities are taken into account.

Depending on various application services, a plurality of vertical networks, public networks or private networks may be built up. In using the private network and the public network, a core network of the 5G or NR system may be shared. Furthermore, the 5G RAN, which is the gNB, may also use the same physical equipment yet by logically sorting them.

A communication network as described in the disclosure is focused on, for example, a 5G or NR system, or 4G LTE system, but the disclosure may be equally applied to other communication system within the scope of the disclosure that may be understood by those of ordinary skill in the art.

Figure 9B:
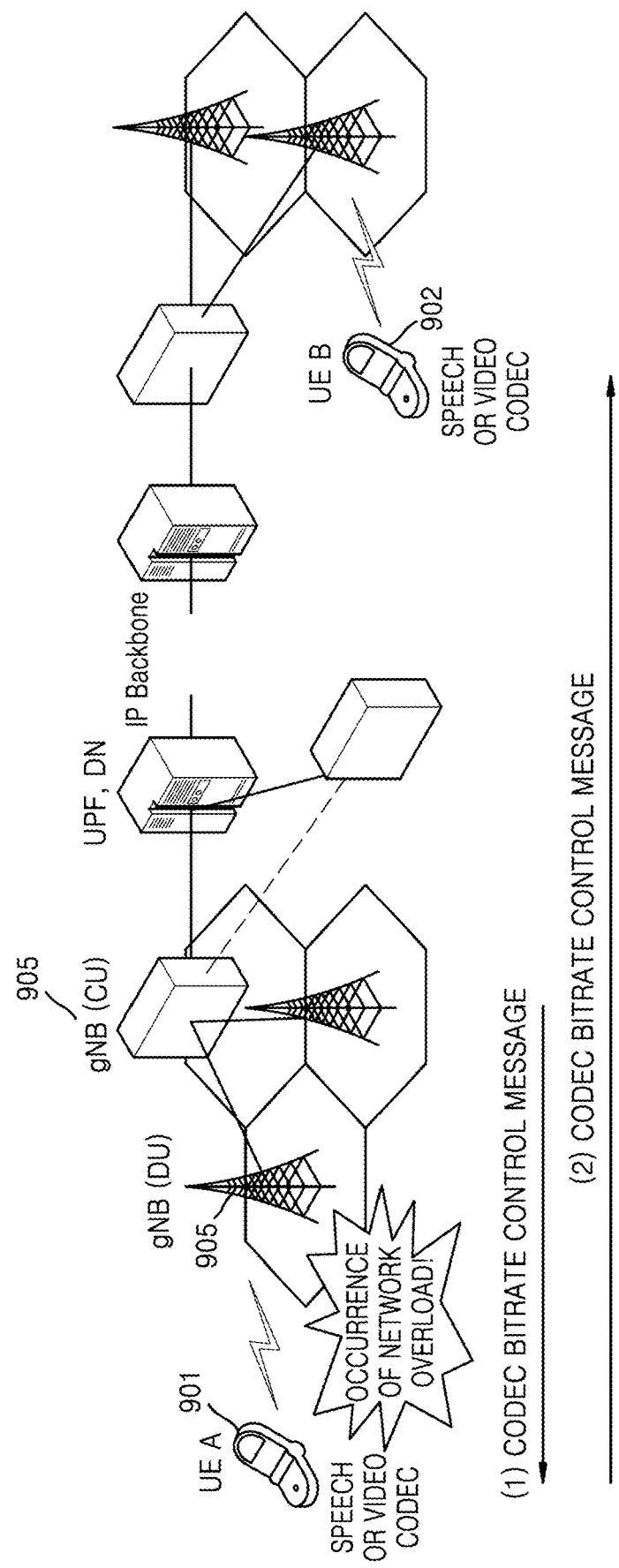
FIG. 9b illustrates a procedure of controlling bitrates in a 5G (NR) mobile communication network.

FIG. 9b illustrates a procedure of controlling bitrates in a general 5G (NR) mobile communication network.

As shown in FIG. 9b, the gNB 905 of the 5G network may recommend a maximum media bitrate to the UE 901 by transmitting a codec bitrate control message. When network overload occurs, the gNB 905 may reduce the maximum media bitrate and after resolution of the overload, the gNB 905 may restore the maximum media bitrate.

The gNB 905 may transmit a codec bitrate control message to the UE 901 so as to control the UE 901 to control its media data compression bitrate. Alternatively, the gNB 905 may control the UE 901 to transmit a codec bitrate control message to the other UE 902 so as to control the other UE 902 to control its media data compression bitrate.

Although the gNB 905 is shown as including a distributed unit (DU) and a central unit (CU), but the disclosure is not limited to the example shown in FIG. 9b. The gNB 905 may be implemented with an all-in-one BS or with more units than the example shown in FIG. 9b. For example, the gNB 905 may be implemented in a structure of three tiers: a central unit (CU), a DU, and a remote unit (RU); a structure of two tiers: a remote radio head (RRH) and a DU; or a CU-DU or DU-RU integrated form.

Figure 10:
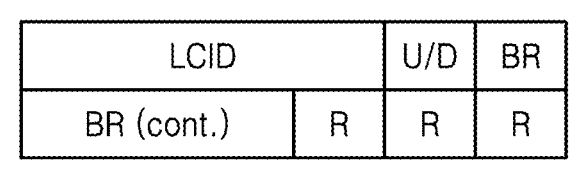

FIG. 10 illustrates a recommended bitrate MAC CE generated by a MAC protocol of a general 5G mobile communication system. As compared with the CE shown in FIG. 7, the CE of FIG. 10 has the same configurations and functions of all fields except for the LCID field being 2-bit more expanded. Overlapping descriptions will not be repeated.

Figure 11:
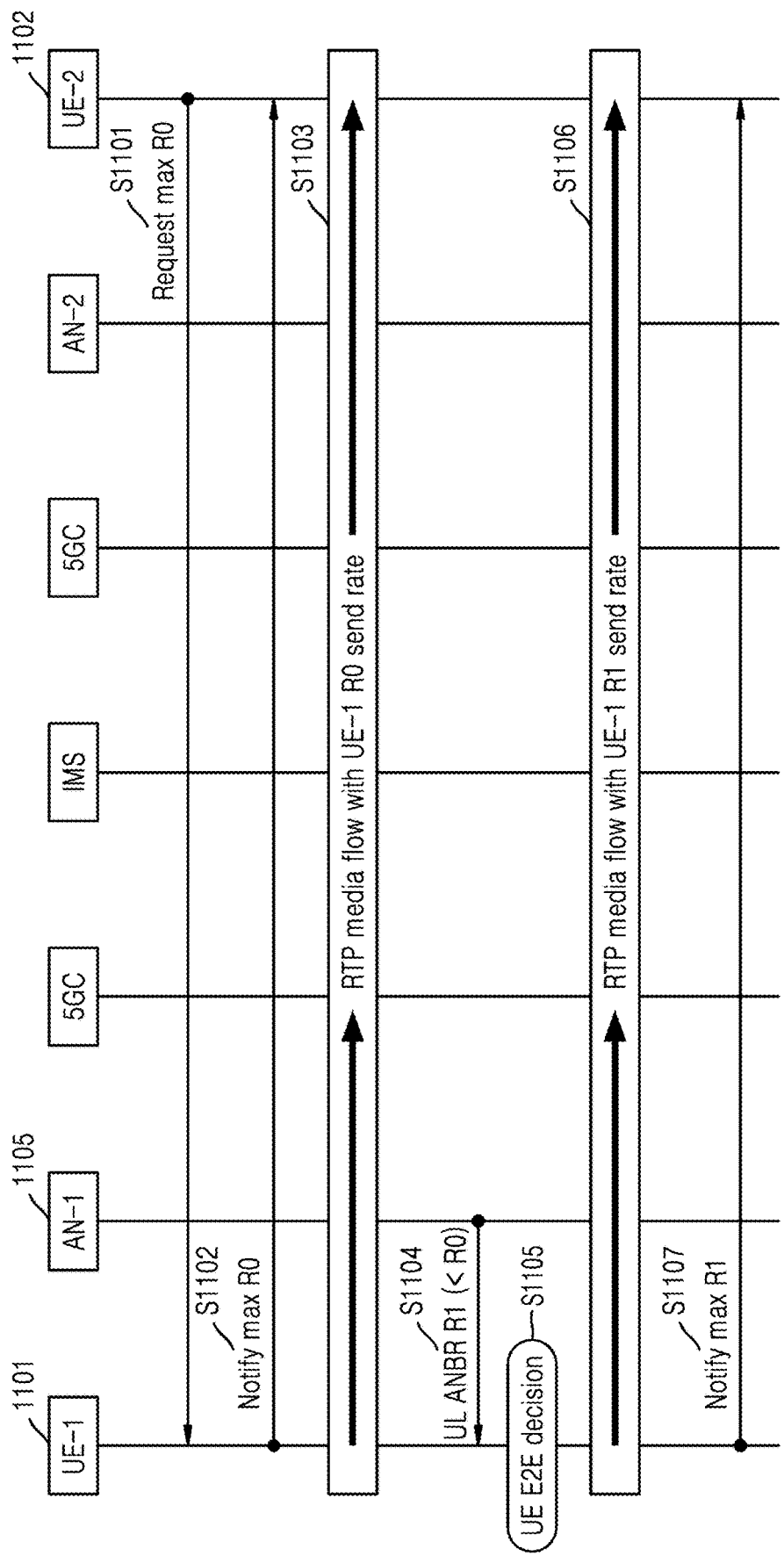
FIG. 11 is a sequence diagram illustrating a procedure of controlling bitrates in a general 5G mobile communication system.

FIG. 11 is a sequence diagram illustrating a procedure of controlling bitrates in a general 5G mobile communication system.

While a first UE 1101 and a second UE 1102 are making a call with each other, the second UE 1102 requests the first UE 1101 to use a bitrate of up to R0 kbps, in operation S1101.

For example, a codec mode request (CMR) message loaded in an RTP payload header may be used to control speech bitrate between the first UE 1101 and the second UE 1102, or a temporary maximum media bitrate request (TMMBR) message included in an RTCP packet may be used to control video bitrate. The CMR message includes a requested speech bitrate, and the TMMBR message includes a requested video bitrate.

The first UE 1101 notifies the second UE 1102 to accept the request, in operation S1102. The first UE 1101 compresses media at R0 kbps and transmits the compressed media to the second UE 1102. The first UE 1101 may notify the second UE 1102 that the requested bitrate control has been accepted or completed.

A notification that the requested bitrate control for video data has been completed may be included in a temporary maximum media bitrate notification (TMMBN) message. A notification that the requested bitrate control for speech data has been completed may be included in a codec mode indication (CMI) message.

Until now, however, there has not been any method of notifying each network node such as an access network (AN)-1 1105 located in a transmission path between the first UE 1101 and the second UE 1102 that the bitrate control has been completed.

When a transmission condition of the AN-1 1105 connected to the first UE 1101 becomes worse, it may be difficult to maintain the maximum bitrate R0 kbps provided by this network for uplink of the first UE 1101. In this case, in the general method, the AN-1 1105 may calculate and transmit a value of the BR field of the recommended bitrate MAC CE to the first UE 1101, in operation S1104, to reduce the bitrate of the first UE 1101 to R0 kbps or less. The value of the BR field of the recommended bitrate MAC CE to be transmitted to the first UE 1101 may be calculated such that the media bitrate is R1 kbps, which is lower than R0 kbps, based on the bitrate measured in the PHY layer.

Upon reception of the recommended bitrate MAC CE from the AN-1 1105, the first UE 1101 may control a codec such that a bitrate obtained by subtracting the bitrate taken for various headers from the PHY bitrate defined by the BR field of the recommended bitrate MAC CE becomes the bitrate of compressed media. The first UE 1101 may determine the bitrate of the compressed media by subtracting a bitrate taken for headers added in the PDCP/RLC/MAC/PHY protocols of an NR modem and a bitrate taken for headers added in the RTP/UDP/IP protocols from the PHY bitrate defined by the BR field of the recommended bitrate MAC CE, in operation S1105.

The first UE 1101 compresses media at the bitrate determined in the operation S1105 and transmits the compressed media to the second UE 1102, in operation S1106. The first UE 1101 may notify the second UE 1102 that the requested bitrate control has been accepted or completed, in operation S1107.

In this case, an error may occur in a procedure in which the first UE 1101 calculates a media bitrate originally intended by the AN-1 1105 by subtracting a bitrate value taken for headers of the RTP/UDP/IP and PDCP/RLC/MAC/PHY protocols from the bitrate value R1 defined by the BR field. When such an error occurs, the first UE 1101 may control a bitrate in a different direction or at a different level from the intention of the network. For example, in the process of estimating a bitrate taken for the RTP/UDP/IP and PDCP/RLC/MAC/PHY protocol headers, the bitrate may be erroneously estimated to be less than an actual bitrate taken for the RTP/UDP/IP and PDCP/RLC/MAC/PHY protocol headers. When such an error occurs, the first UE 1101 may apply a media bitrate, that is increased against the original intention of the network to reduce the bitrate, to compress media and transmit the compressed media to the second UE 1102.

Figure 12:
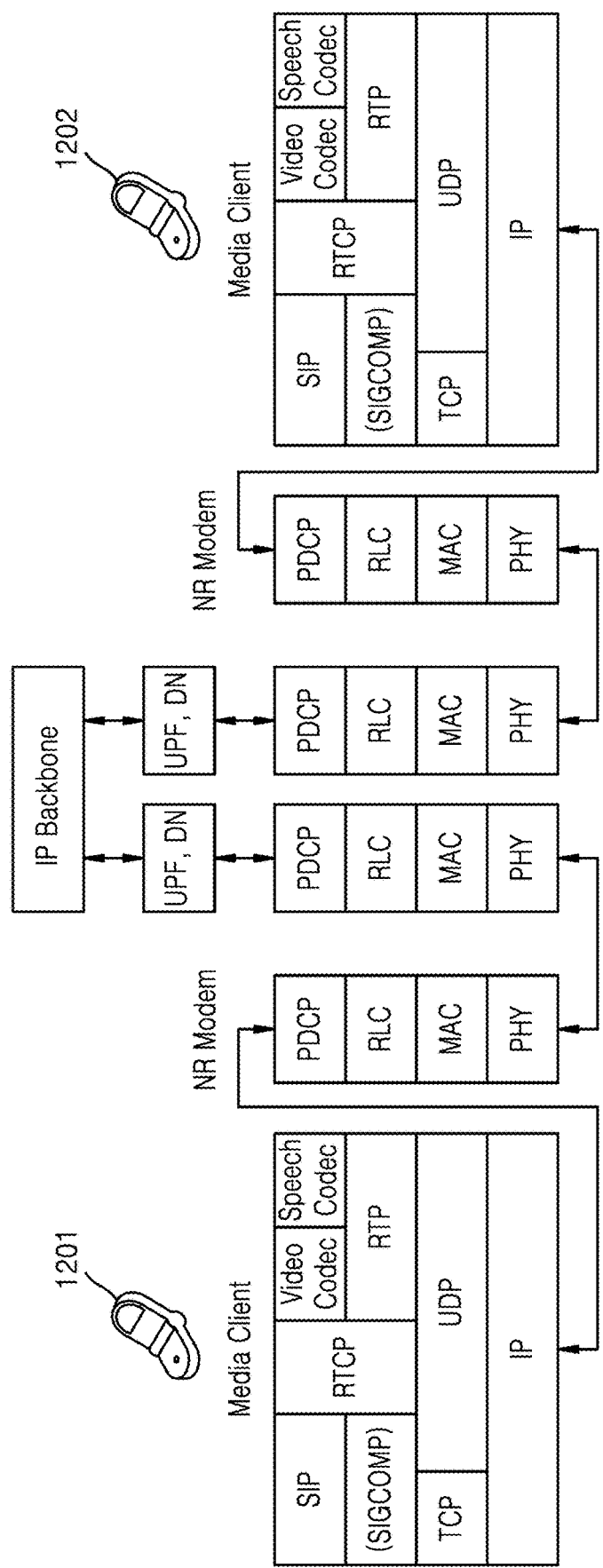
FIG. 12 illustrates a whole protocol architecture of a 5G mobile communication system.

FIG. 12 illustrates a whole protocol architecture of a 5G mobile communication system.

A real time protocol (RTP) may be used by an IP based network to transmit data in real time. A real time control protocol (RTCP) may be used by the IP based network to control real time data transmission. The RTCP may correspond to control packets for handling congestion of multichannel audio or wide-angled video.

An NR modem shown in FIG. 12 may support 5G. PDCP, RLC, MAC, and PHY are communication protocols that make up a modem of each of the UE and the BS. UPF and DN are nodes that make up a 5G core network (5GC).

The BS may recommend a maximum bitrate of each UE to the UE by adding the maximum bitrate to a CE of a MAC header based on a bitrate measured in the PHY. The maximum bitrate recommended to each UE may include a media bitrate, a bitrate allocated for the RTP/UDP/IP protocol headers, and a bitrate allocated for the PDCP/RLC/MAC/PHY protocol headers. The BS is unable to know of a type of the codec used by the UE or the media bitrate.

Hence, the UE may estimate a bitrate allocated for the RTP/UDP/IP protocol headers and a bitrate allocated for the PDCP/RLC/MAC/PHY protocol headers, and subtract the estimated bitrates from the bitrate defined by a value of the BR field of the MAC CE. The UE may use, for compressing media data, a bitrate resulting from the subtraction of the estimated bitrate from the media codec. Alternatively, the UE may request the other UE to apply the bitrate resulting from the subtraction of the estimated bitrates to a media codec of the other UE.

Figure 13:
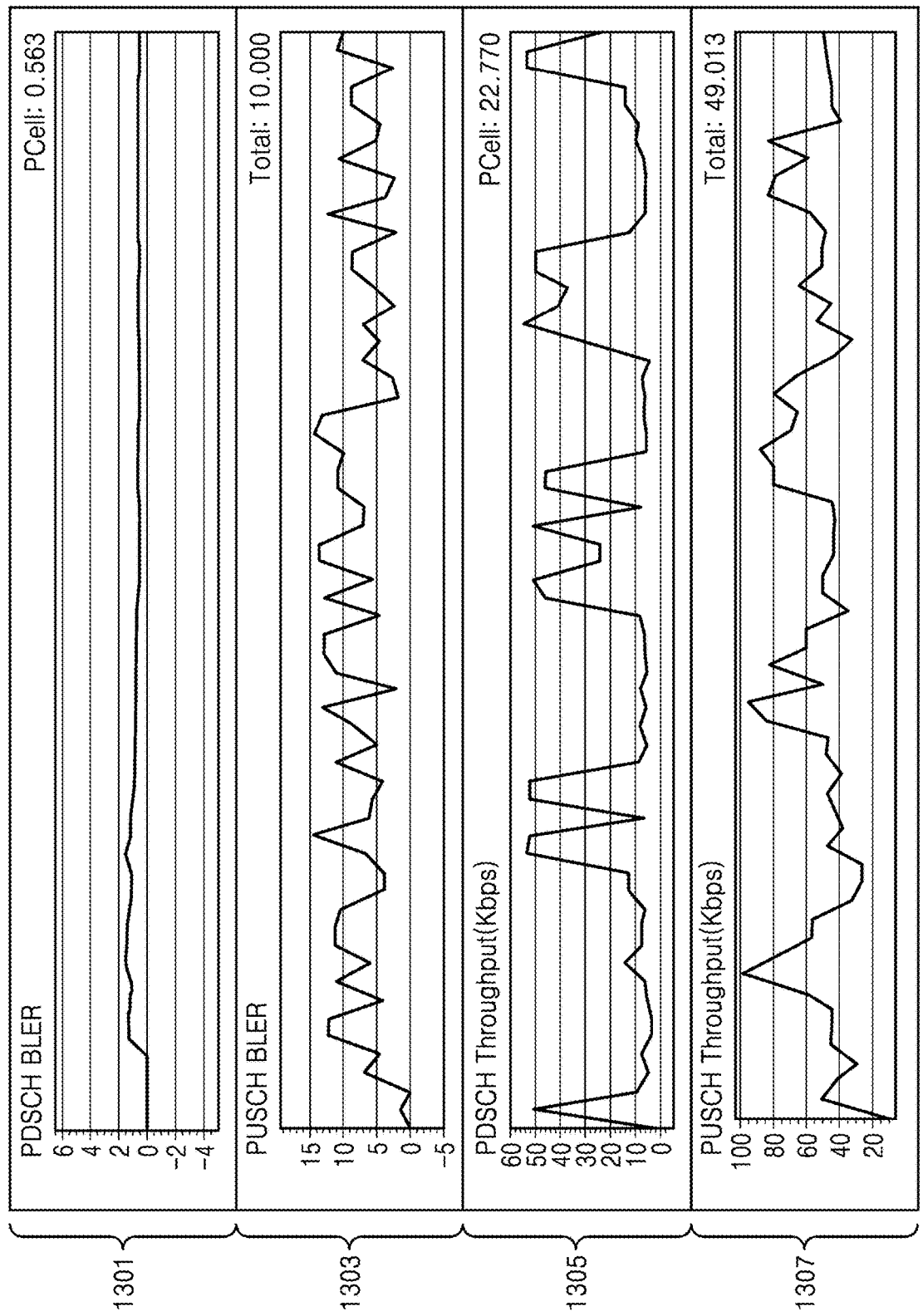
FIG. 13 illustrates block error rates and throughput of voice packets transmitted or received in a voice over LTE (VoLTE) video call.

FIG. 13 illustrates block error rates and throughput of voice packets transmitted or received in a voice over LTE (VoLTE) video call. In FIG. 13, block rates and throughput values of voice packets transmitted or received in the VoLTE video call are measured from bidirectional transmission channels of the PHY, i.e., from a physical uplink shared channel (PUSCH) and a physical downlink shared channel (PDSH). The throughput may be a value obtained by dividing an amount of data completely transmitted for a certain time by the time. An encoder of an AMR-WB speech codec used in a call may have three types of output bitrate values. The three types of output bitrate values may include a normal speech frame, silence with no speech activity, and a silence descriptor frame (SID) periodically generated and transmitted to update characteristics of background noise information in a silence condition.

In FIG. 13, a first graph 1301 shows block error rates of voice packets measured from a PDSCH, and a second graph 1303 shows block error rates of voice packets measured from a PUSCH. In addition, in FIG. 13, a third graph 1305 shows throughput of voice packets measured from a PDSCH, and a fourth graph 1307 shows throughput of voice packets measured from a PUSCH.

Compared with the first and second graphs 1301 and 1303, the third and fourth graphs 1305 and 1307 show more complicated waveforms obtained by adding RTP/UDP/IP and PDCP/RLC/MAC/PHY protocol header values to the three types of bitrates, i.e., the speech frame, the silence, and the SID. Hence, it may be difficult for the UE to estimate the original bitrate or waveform of the speech codec from the third or fourth graph 1305 or 1307 having various values affected by the various protocol header values.

Figure 14:
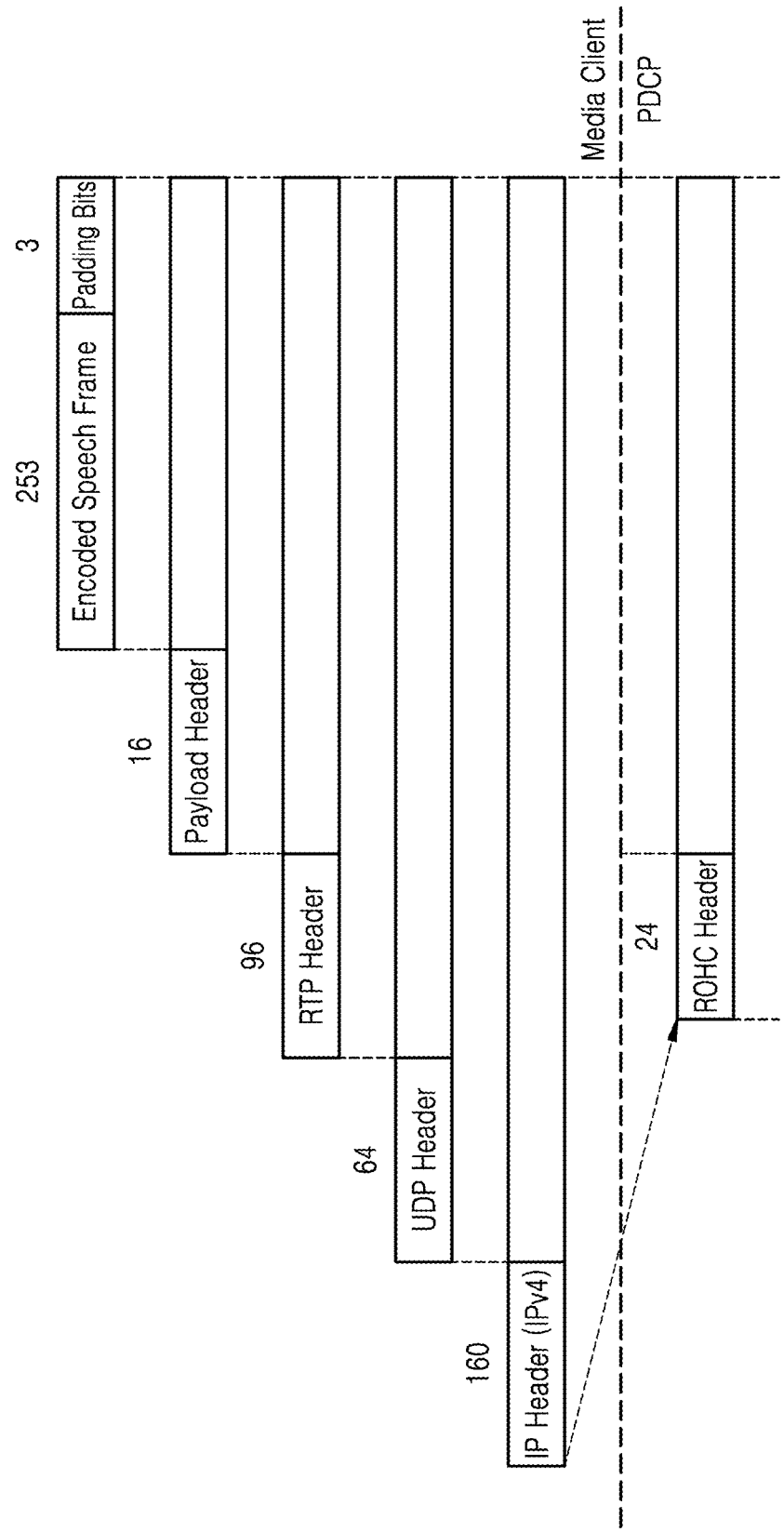
FIG. 14 illustrates a media frame to which RTP/UDP/IP headers, a payload header, and padding bits are added.

FIG. 14 illustrates a media frame to which RTP/UDP/IP headers, a payload header, and padding bits are added. PDCP may compress the RTP/UDP/IP headers into a robust header compression (ROHC) header. Compressed media data (e.g., compressed speech frame) having the header attached thereto may go through various segmentation, concatenation, and addition processes while passing NR modem protocols. This may increase possibility of an error occurring in calculating a media bitrate.

Figure 15:
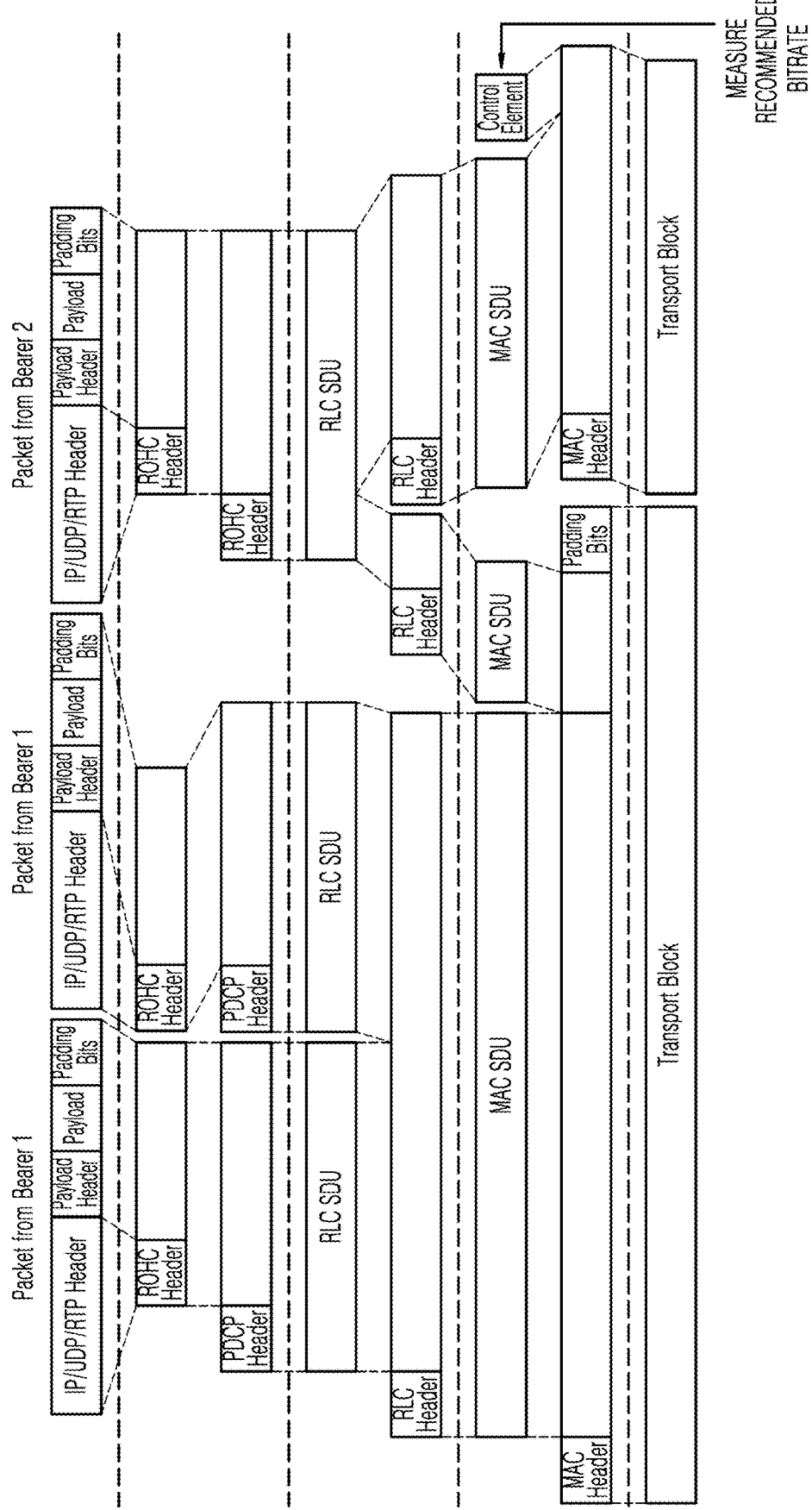
FIG. 15 illustrates a procedure in which a media frame to which RTP/UDP/IP headers, a payload header, and padding bits are added goes through packet data convergence protocol (PDCP)/radio link control (RLC)/MAC protocols of an NR modem.

FIG. 15 illustrates a procedure in which a media frame to which RTP/UDP/IP headers, a payload header, and padding bits are added goes through a PDCP/RLC/MAC protocols of an NR modem.

Referring to FIG. 15, while each media frame goes through a complicated procedure of segmentation, concatenation, and CE addition depending on the size of the media frame, the media frame may be changed into a different direction or rate than a change of the original bitrate value of the media frame. Hence, the UE may have difficulty in going this procedure backward to estimate a bitrate of the media frame, and the error size may be larger than the bitrate of the media itself such as a speech frame.

Furthermore, a change in bitrate is made during a procedure in which 40-byte RTP/UDP/IP headers are reduced to 3 to 5 bytes in compressing the RTP/UDP/IP headers in the PDCP using the ROHC technique and then expanded back at the other UE, so calculating of the media bitrate may become more difficult.

Figure 16:
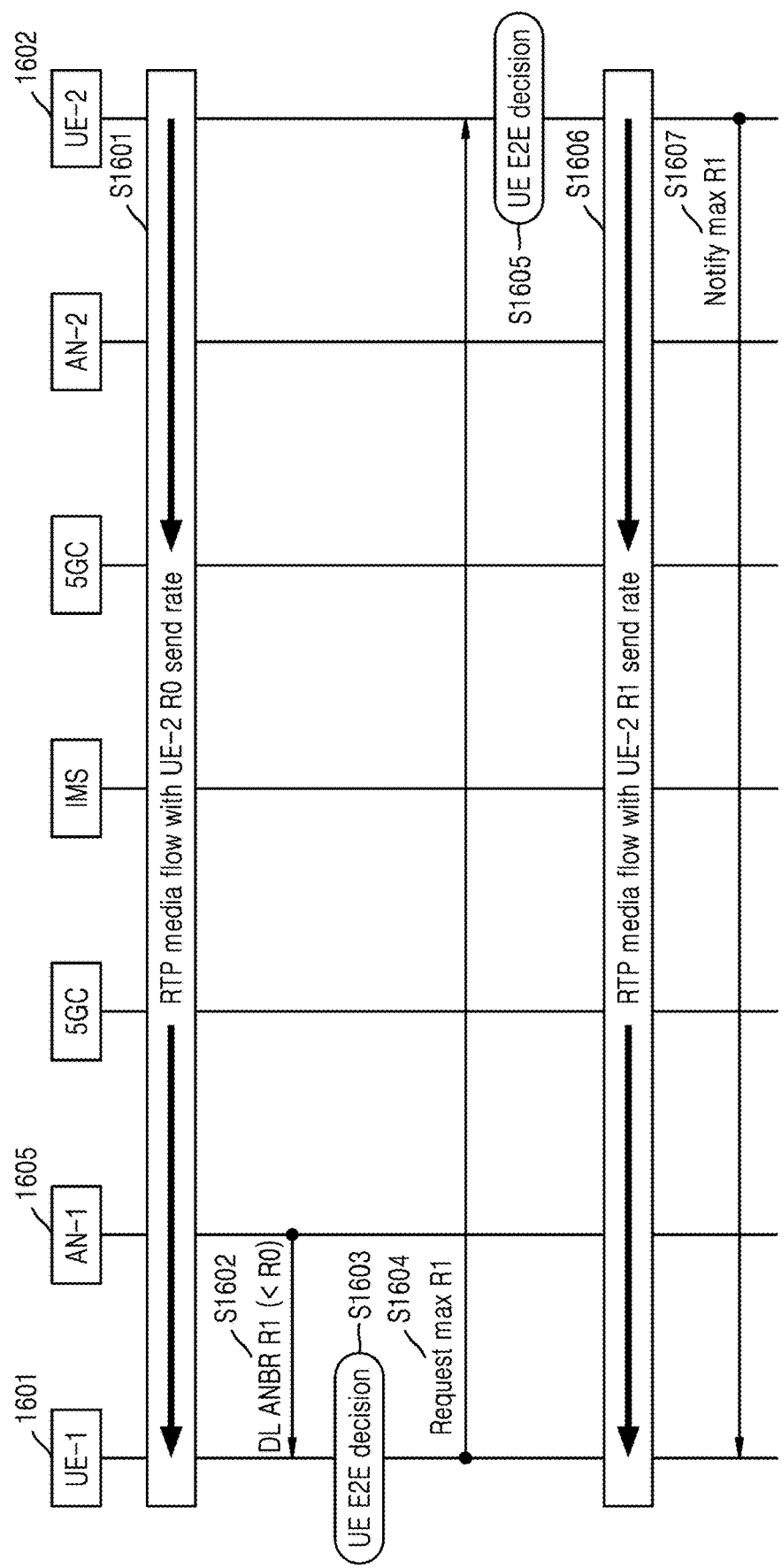
FIG. 16 is a sequence diagram illustrating a procedure of controlling bitrates in a general 5G mobile communication system.

FIG. 16 illustrates another example of a procedure of controlling bitrates in a general 5G mobile communication system.

Media compressed at a bitrate of R0 kbps is transmitted from a second UE 1602 to a first UE 1601, in operation S1601. An AN-1 1605 connected to the first UE 1601 may fill a value in the BR field of a MAC CE to indicate using a media bitrate of R1 kbps, which is smaller than R0 kbps, and transmit it on a downlink to the first UE 1601, in operation S1602.

Upon reception of the recommended bitrate MAC CE from the AN-1 1605, the first UE 1601 determines a bitrate for compressed media to be R1 bps, in operation S1603.

The first UE 1601 requests the second UE 1602 to reduce a speech or video bitrate to R1 kbps or less by transmitting a CMR message (when a speech frame is transmitted) or a TMMBN message (when an image frame is transmitted) to the second UE 1602, in operation S1604.

Upon reception of the message, the second UE 1602 compresses media at a bitrate reduced as requested and transmits the compressed media to the first UE 1601, in operation S1606. The second UE 1602 notifies the first UE 1601 that the requested bitrate control has been accepted or completed, in operation S1607. In this case, an error may occur in the operation S1603 where the first UE 1601 estimates a bitrate taken for the RTP/UDP/IP and PDCP/RLC/MAC/PHY protocol headers and determines a bitrate to be taken for the media from the BR value. For example, contrary to an intention of AN-11605 to reduce the bitrate from R0 kbps to R1 kbps, the first UE1601 may transmit to the second UE 1602 a request to use a bitrate greater than R0 kbps. Alternatively, R2 kbps smaller than R0 kbps but larger than R1 kbps which is considered by the AN-1 1605 may be determined by the first UE 1601.

The second UE 1602 may notify the first UE 1601 that the requested bitrate control has been accepted or completed in the TMMBN message for video or the CMI message for speech. Until now, however, there has been no way of notifying each network node such as the AN-1 1605 located in a transmission path between the first UE 1601 and the second UE 1602 that the bitrate control has been completed.

Figure 17:
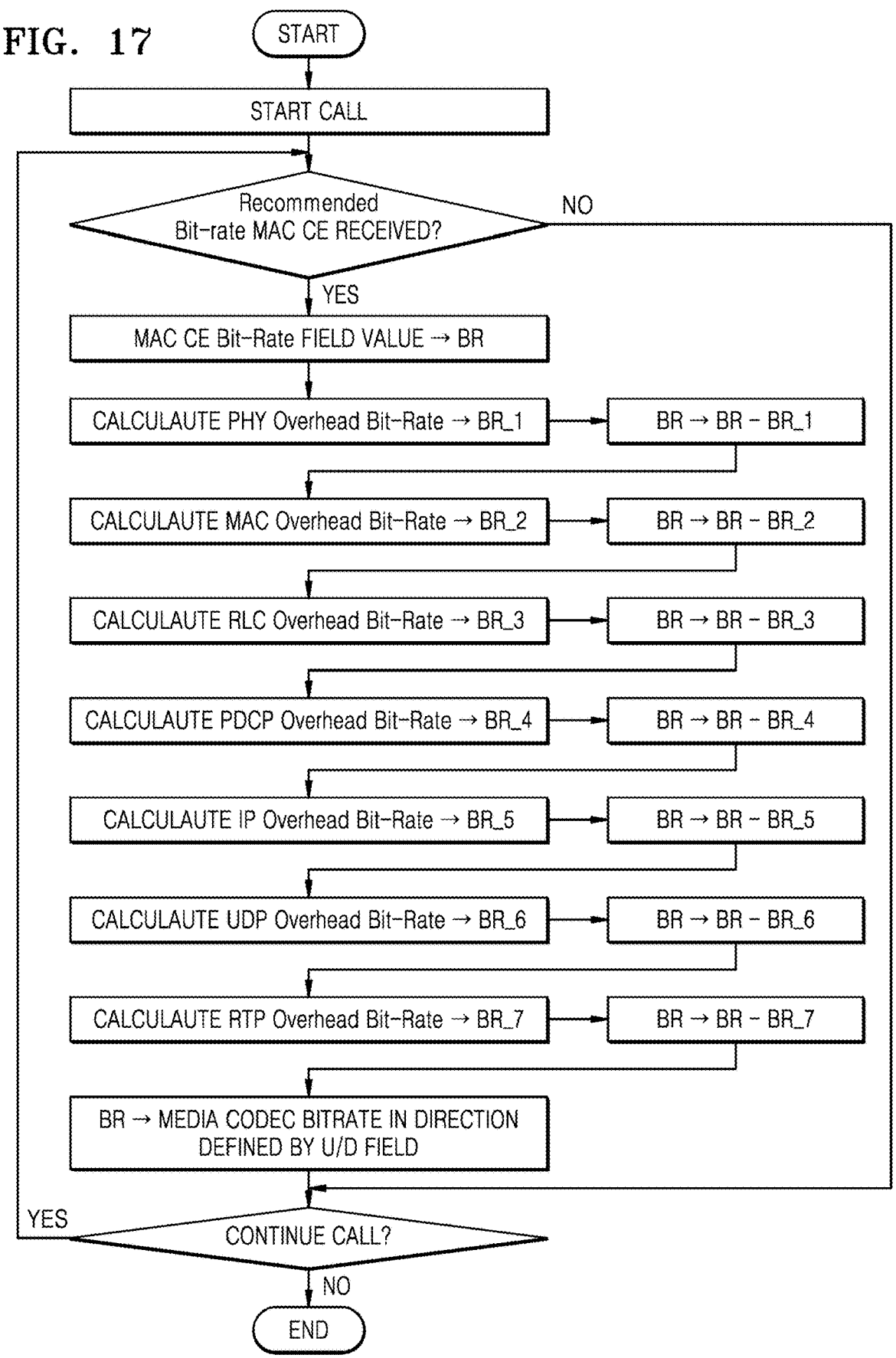
FIG. 17 is a flowchart illustrating a method of controlling a bitrate by a UE that supports the general 5G.

FIG. 17 illustrates a bitrate control procedure in a UE by using a recommended bitrate MAC CE based on a general technology.

When a call is started, a UE checks when a MAC CE transmitted by a gNB has been received, and when the MAC CE has been received, the UE stores a bitrate value corresponding to a 6-bit BR field as a BR variable in the UE. The UE then calculates BR_1, which is a bitrate of overhead, such as a header added in the PHY protocol in a direction defined by the U/D field and subtracts the calculated BR_1 from the BR. Subsequently, the UE calculates BR_2, which is a value of overhead such as a header added in the MAC protocol, and subtracts the BR_2 from the BR. In this way, BR_3, BR_4, BR_5, BR_6, and BR_7, which are overhead values added in the RLC, PDCP, IP, UDP, and RTP protocols, are calculated in sequence, and subtracted from the BR value, resulting in a final bitrate to be applied to the media codec.

When the transmission direction of media data whose bitrate is to be controlled is an uplink, the UE may apply the calculated final bitrate value to an encoder of its media codec. On the contrary, when the transmission direction of the media data whose bitrate is to be controlled is a downlink, the UE may request the other UE to control the bitrate by transmitting a message such as a TMMBR message or a CMR message to the other UE.

Accordingly, in the general technology, various errors may occur and be accumulated in the procedure in which the UE calculates BR_1 to BR_7 as shown in FIG. 17.

As described above, for general RAN-assisted codec adaptation that uses the recommended bitrate MAC CE, the gNB needs to set a BR field value based on the PHY by taking into account a media bitrate value to be applied to the UE, and in this procedure, an error might occur. Furthermore, in a procedure in which the UE removes RTP/UDP/IP protocol headers and PDCP/RLC/MAC/PHY protocol headers and calculates from the BR field value of the received MAC CE a value to be applied to media, an error may occur as well. Due to the errors, the UE may control the bitrate in a direction or to a value different from that intended by the gNB.

The recommended bitrate MAC CE as shown in FIGS. 7 and 10 includes only a maximum bitrate information recommended by the gNB to the UE and may indicate to the other UE that the UE has completed the requested bitrate control, but there has been no way for the UE to report this to the requesting gNB. Hence, the gNB may not be able to properly manage radio resources used by the UEs in a cell. The general technology allows only the maximum bitrate to be controlled, but in practice, control over an average bitrate may be required rather than over the maximum bitrate depending on a type or compression scheme of media.

To address the aforementioned problems, the disclosure provides an apparatus and method of controlling bitrates of the UE that transmits or receives media, such as video and speech in a mobile communication network to make the most of limited transmission bandwidth and manage the quality.

Figure 18:
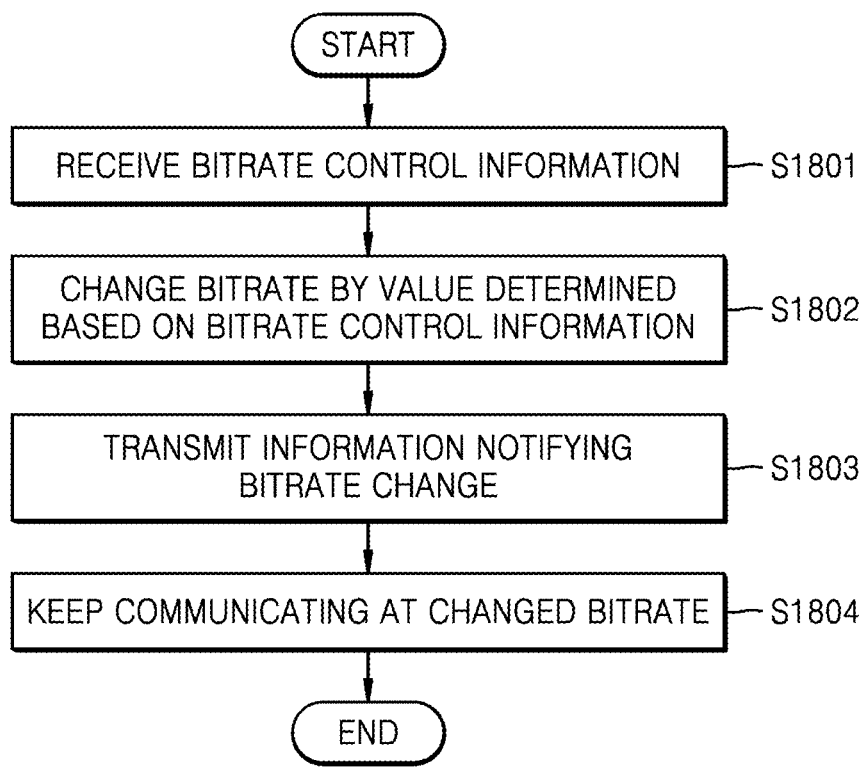
FIG. 18 is a flowchart illustrating a method of controlling a bitrate by UE, according to an embodiment of the disclosure.

FIG. 18 is a flowchart illustrating a method of controlling a bitrate by a UE, according to an embodiment of the disclosure. In the embodiment of the disclosure, a UE may make a call with the other UE based on a maximum bitrate agreed with the other UE. When a BS connected to the UE encounters network overload while the UE is making the call, the BS may attempt to control a media bitrate by transmitting bitrate control information to the UE.

Although the following description is focused on a case that the BS controls a media bitrate as an example, the disclosure is not limited to the example shown in FIG. 18. Of the entities making up the NR core network as shown in FIG. 9a, not only the gNB 905 but also at least one of the AMF 911, the SMF 921, the UPF 931, the UDM 951, or the PCF 961 may control the media bitrate. Even in the case that the other entity than the gNB 905 controls the media bitrate, the method shown in FIG. 18 may be equally used. Overlapping descriptions will not be repeated.

In operation S1801, the UE receives bitrate control information. For example, the UE may receive from a BS in a 5G mobile communication network, e.g., a gNB, a recommended bitrate MAC CE generated by the MAC protocol as the bitrate control information.

In an embodiment of the disclosure, the recommended bitrate MAC CE may include information about at least one of a logical channel identifier, a transmission direction of media data, a bitrate value to be changed, whether to increase or decrease the bitrate, which of the maximum bitrate and the average bitrate is to be changed, whether the recommended bitrate MAC CE is to request or indicate a change in bitrate, or a CE identifier.

Figure 19:
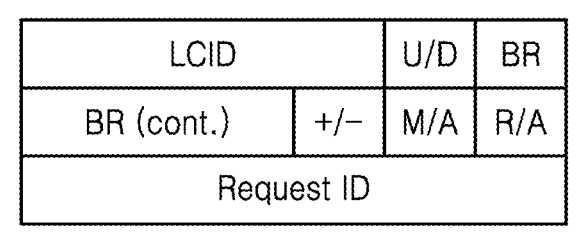

A recommended bitrate MAC CE according to an embodiment of the disclosure will now be described with reference to FIG. 19. The numbers of bits and functions of a BR field and a U/D field shown in FIG. 19 are the same as those of the corresponding fields of FIGS. 7 and 10, so the overlapping description will not be repeated.

A value of a +/− field newly proposed in the disclosure may indicate whether to increase or decrease the bitrate based on the current bitrate. When the value of the +/− field is 0, the UE may increase the current bitrate by a bitrate represented by the BR value. When the value of the +/− field is 1, the UE may decrease the current bitrate by the bitrate represented by the BR value. For example, as shown in FIG. 8, the bitrate may be increased or decreased by 8 to 8000 kbps based on the BR value.

A value of a maximum/average (M/A) field newly proposed in the disclosure may indicate which of the maximum bitrate and the average bitrate is to be changed. When the value of the M/A field is 1, it means that the UE may increase or decrease the maximum bitrate by the bitrate represented by the BR value. When the value of the M/A field is 0, it means to increase or decrease the average bitrate by the bitrate represented by the BR value.

A request/acknowledge (R/A) field newly proposed in the disclosure may indicate whether the recommended bitrate MAC CE is to request or indicate a change in bitrate.

In an embodiment of the disclosure, the gNB may fill values in the BR, U/D, +/−, and M/A fields, set the value of the R/A field to 1 (meaning request), and transmit the recommended bitrate MAC CE with arbitrary value for Request ID to the UE. The Request ID in 8 bits may represent an integer between 0 to 255. The UE may control the bitrate based on the received BR field value, set the value of the R/A field to 0 (meaning acknowledge), and return the recommended bitrate MAC CE to the gNB. The recommended bitrate MAC CE returned by the UE to the gNB may include the same Request ID as in the recommended bitrate MAC CE received from the gNB.

The gNB may confirm that the UE has completed the bitrate control requested by the gNB, based on values of the R/A field and Request ID field in the recommended bitrate MAC CE transmitted from the UE.

In operation S1802, the UE changes the bitrate by a value determined based on the bitrate control information.

First, the UE may identify first information indicating a transmission direction of media data and second information indicating which of the maximum bitrate and the average bitrate is to be changed, from the bitrate control information received in operation S1801. The UE may determine a bitrate to be changed, based on the first information and the second information.

For example, the UE may determine whether the transmission direction of the media data whose bitrate is controlled is an uplink or a downlink, based on a value of the U/D field included in the received recommended bitrate MAC CE. The UE may determine which of the maximum bitrate and the average bitrate is to be changed, based on a value of the M/A field included in the recommended bitrate MAC CE received from the gNB.

Next, the UE may identify third information about a bitrate value to be changed and fourth information indicating whether to increase or decrease the bitrate, from the bitrate control information. The UE may change the bitrate determined to be changed, based on the third information and the fourth information.

For example, the UE may determine to increase or decrease the current bitrate by a value indicated in the BR field, based on a value of the +/− field included in the received recommended bitrate MAC CE.

For example, the UE may identify the transmission direction of the media data as an uplink based on the bitrate control information. For example, when the value of the U/D field included in the bitrate control information is 1, the UE may determine that the transmission direction of the media data is an uplink. In this case, the UE may apply the bitrate changed by the value determined based on the bitrate control information to its media codec.

In another example, the UE may identify the transmission direction of the media data as a downlink based on the bitrate control information. For example, when the value of the U/D field included in the bitrate control information is 0, the UE may determine that the transmission direction of the media data is a downlink. In this case, the UE may request the other UE to apply the bitrate changed by the value determined based on the bitrate control information to a codec of the other UE. In this case, the UE may receive from the other UE information notifying that the bitrate has been changed.

In operation S1803, the UE transmits information notifying that the bitrate has been changed. For example, the UE may transmit the information notifying that the bitrate has been changed to the gNB.

The information notifying that the bitrate has been changed may include a recommended bitrate MAC CE including the same identifier as that of the recommended bitrate MAC CE received in the operation S1801.

To distinguish between the two CEs, the CE transmitted to the UE in the operation S1801 is called a first recommended bitrate MAC CE, and the CE transmitted from the UE in the operation 1803 is called a second recommended bitrate MAC CE. The first recommended bitrate MAC CE and the second recommended bitrate MAC CE may each include the R/A field indicating information about whether the recommended bitrate MAC CE is to request or notify a change in bitrate. For example, the R/A field of the first recommended bitrate MAC CE may have a value of 1, and the R/A field of the second recommended bitrate MAC CE may have a value of 0.

In operation S1804, the UE may continue the call at the changed bitrate.

FIG. 19 illustrates a structure of a new recommended bitrate MAC CE that may solve the problem of RAN-assisted codec adaptation using the general recommended bitrate MAC CE shown in FIGS. 7 and 10.

The disclosure proposes +/−, M/A, and R/A fields newly defined by using the non-used three R bits in the general NR MAC CE and a 1-byte Request ID field. In the general technology, the gNB sets a BR field of the recommended bitrate MAC CE based on the PHY. Hence, the UE needs to calculate a bitrate value to be used for media from the bitrate defined by the BR value. The UE may calculate a bitrate value to be used for the media by estimating bitrates taken for RTP/UDP/IP and PDCP/RLC/MAC/PHY protocol headers and subtracting the estimated bitrates from the bitrate defined by the BR value. In this case, there is a high possibility of an error occurring in the procedure in which the UE calculates the media bitrate value from the BR value. When the error occurring in the procedure of calculating the media bitrate value is serious, it may grow more than the media bitrate itself.

A goal of the RAN-assisted codec adaptation is to efficiently manage mobile communication network radio resources by controlling the media bitrate of the UE. The gNB may not correctly know of a bitrate of media compressed by each UE, a type of a codec, and an operation scheme of the codec. Accordingly, the disclosure is based on a determination that even when the gNB transmits a relative value instead of an absolute value of a media bitrate to be used by the UE to increase or decrease the current bitrate, a similar result may be obtained in terms of network management. Furthermore, unlike the general technology, in an embodiment of the disclosure, as the gNB may be able to ascertain that bitrate control requested by the gNB to the UE has been completed, the gNB may efficiently manage operations of many UEs located in a cell.

In the meantime, an enhanced voice services (EVS, 3GPP TS 26.445) codec used for voice call in mobile communication may operate at a designated maximum bitrate as in 24.4 kbps mode or an average bitrate as in 5.9 kbps mode.

A video codec may also operate in various modes such as constant bitrate (CBR) mode or variable bitrate (VBR) mode. Hence, in an embodiment of the disclosure, radio resources may be more accurately managed by supporting a method of designating an average bitrate in addition to a method of designating a maximum bitrate based on a state of the network.

Figure 20:
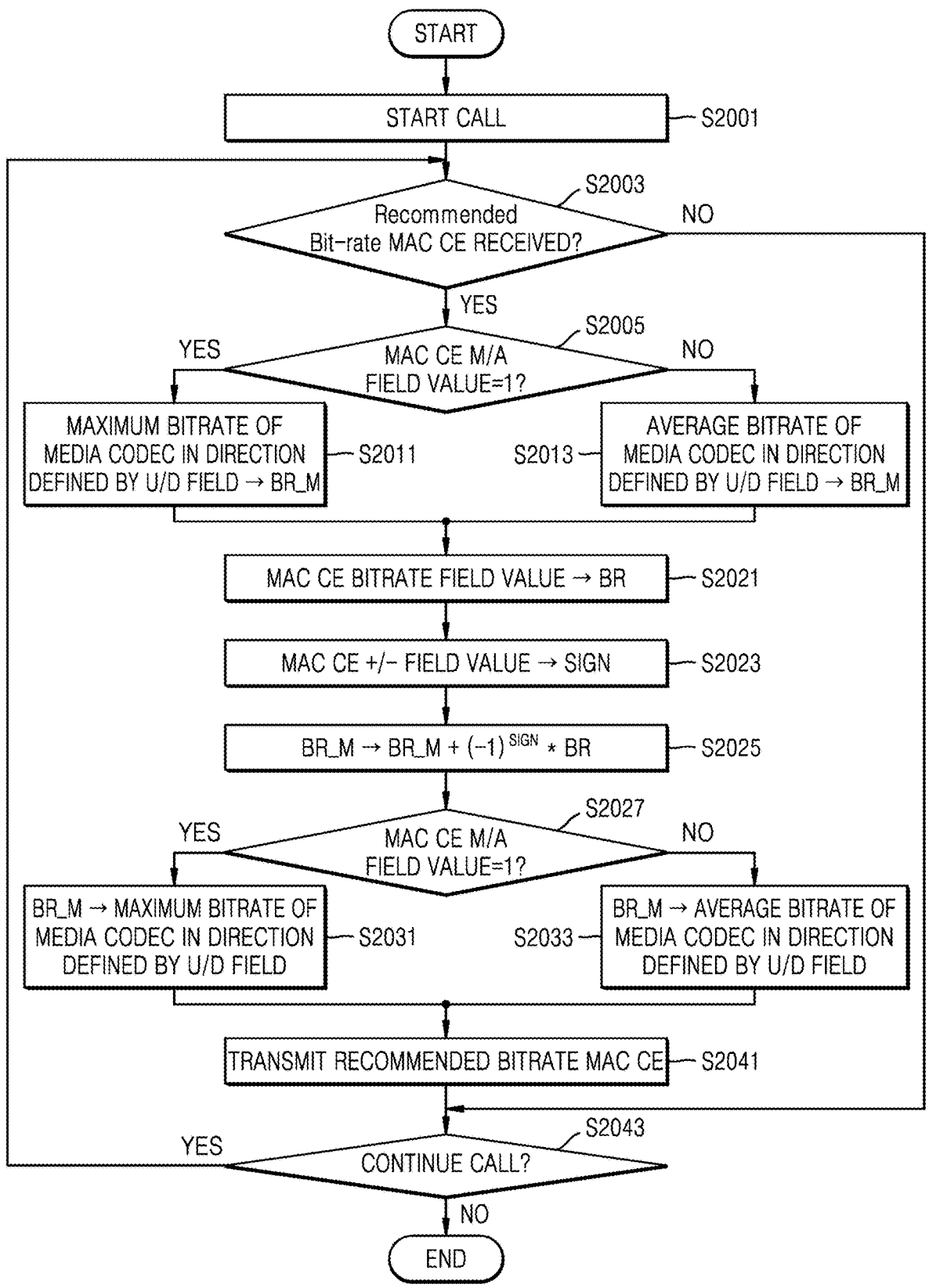
FIG. 20 is a detailed flowchart illustrating a method of controlling a bitrate by a UE, according to an embodiment of the disclosure.

FIG. 20 is a detailed flowchart illustrating a method of controlling a bitrate by UE, according to an embodiment of the disclosure.

In operation S2001, the UE may start a call with the other UE. To start the call, the UE and wired/wireless network nodes may perform a session negotiation and resource reservation procedure using an IP multimedia subsystem (IMS). Each node including a gNB on the transmission path may determine quality of service (QoS) to be maintained during the call, and control bitrates based on the determined QoS value. In an embodiment of the disclosure, bitrate may be increased or reduced based on a QoS value known to the UE and all the nodes.

FIG. 25 illustrates an information element (IE) used to notify a QoS value to a UE and network nodes. In FIG. 25, the 15th to 18th bytes represent maximum bitrates and guaranteed bitrates for downlink and uplink. Values included in the 15th to 18th bytes in the IE of FIG. 25 correspond to bitrates measured in the IP layer, which have values obtained by adding overheads of the RTCP/UDP/IP protocols to the bitrate of media with RTP/UDP/IP headers attached thereto. In a wired network section, the bitrate values included in the 15th to 18th bytes of the IE of FIG. 25 may be applied. In a wireless network section between the UE and the gNB, however, the RTP/UDP/IP headers attached to the media and the UDP/IP headers attached to the RTCP are compressed by the PDCP of the modem as shown in FIG. 3, and headers of the PDCP/RLC/MAC/PHY protocols are additionally attached to the compressed packet. Accordingly, in the wireless network section, the bitrate values included in the 15th to 18th bytes of the IE of FIG. 25 may not be applied.

After the start of the call in the operation S2001, the UE confirms whether a recommended bitrate MAC CE transmitted by the gNB has been received in operation S2003. In operation S2005, the UE may determine which of the maximum bitrate and the average bitrate is to be changed, based on a value of the M/A field of the recommended bitrate MAC CE.

When the value of the M/A field is 1, the UE stores a maximum bitrate of a media codec in a direction defined by the U/D field for a BR_M variable, in operation S2011. Otherwise, when the value of the M/A field is 0, the UE stores an average bitrate of the media codec in the direction defined by the U/D field for the BR_M variable, in operation S2013.

In operation S2021, the UE may obtain a relative bitrate value recommended for change based on a 6-bit BR field of the recommended bitrate MAC CE, and store the obtained bitrate value for the BR variable.

In operation S2023, the UE stores a value of the +/− field of the recommended bitrate MAC CE for a SIGN variable. In operation S2025, when the sign variable has a value of 0, the UE adds the BR value to the BR_M value and stores the result as the BR_M value, and when the sign variable has a value of 1, the UE subtracts the BR value from the BR_M value and stores the result as the BR_M value In operation S2027, the UE may determine which of the maximum bitrate and the average bitrate is to be changed, based on a value of the M/A field of the recommended bitrate MAC CE.

When the value of the M/A field is 1, the UE may determine the BR_M controlled in the operation S2025 as a maximum bitrate of a media codec in a direction defined by the U/D field, in operation S2031. Otherwise, when the value of the M/A field is 0, the UE may determine the BR_M controlled in the operation S2025 as an average bitrate of the media codec in the direction defined by the U/D field, in operation S2033.

Unlike the general recommended bitrate MAC CE that allows only maximum bitrate control request, the recommended bitrate MAC CE proposed in various embodiments of the disclosure may support a maximum or average bitrate control function using the M/A field.

Figure 21:
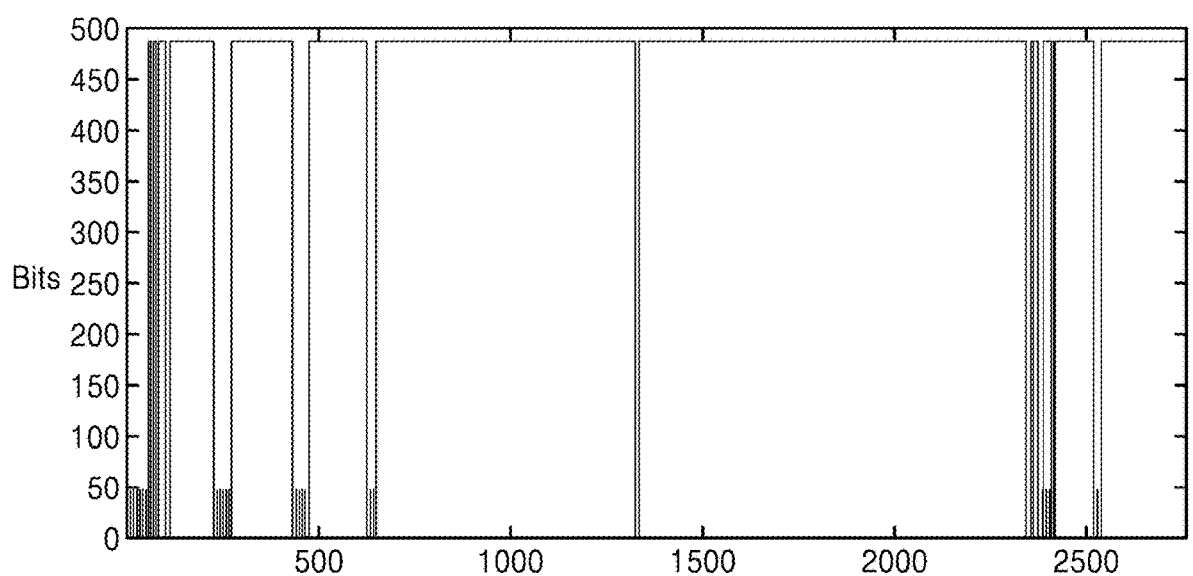
FIG. 21 illustrates waveforms generated by compressing speech using an enhanced voice services (EVS) codec.

FIG. 21 shows a bit number per frame of 2760 frames generated by compressing a speech 55.2 seconds long using an EVS codec capable of compressing speech and audio signals in mobile communication. In an embodiment of the disclosure, the UE may compress a speech signal sampled 32,000 times for each second, and transmit 488 bits per frame when there is a speech activity, 0 bit (silence) when there is no speech activity, and an SID frame for every 8 frames when there has been no speech activity for a long time. The 2760 frames shown in FIG. 21 include 2498 speech frames, 41 SID frames, and 221 silence frames.

Referring to FIG. 21, a maximum bitrate of the compressed speech is 488/(20*0.001)=24.4 kbps, and an average bitrate is (488*2498+48*41)/(2760*20*0.001)=22.1 kbps. The average bitrate and the maximum bitrate are almost equal to each other, so for the input signals and compression scheme that output the waveform shown in FIG. 21, it may be efficient for the gNB to control the maximum bitrate of the speech codec.

Figure 22:
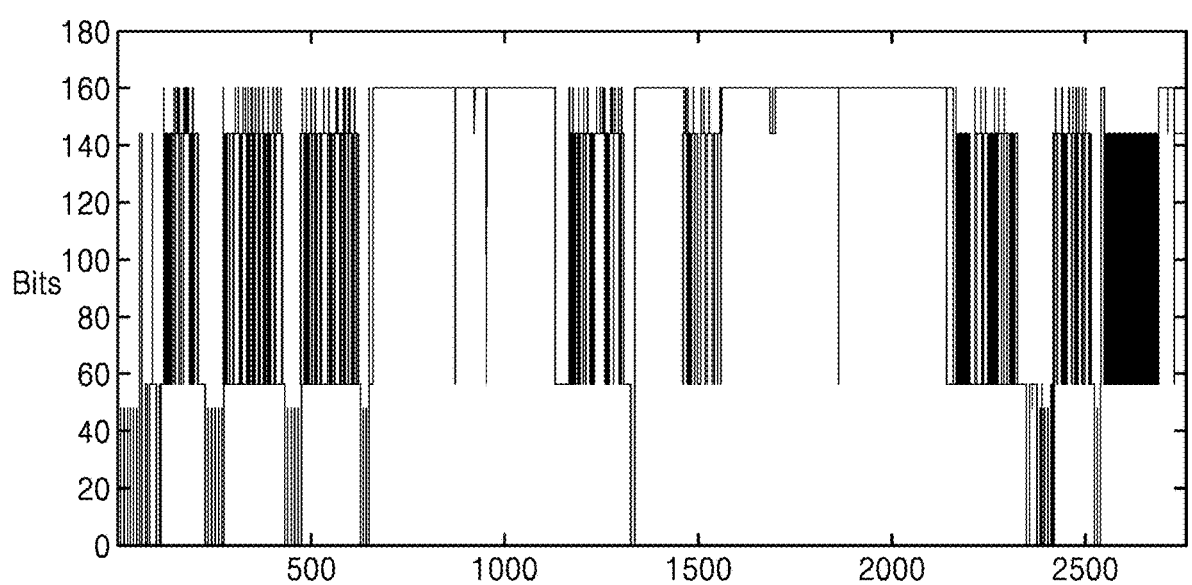
FIG. 22 illustrates waveforms generated by compressing speech using an EVS codec.

FIG. 22 shows the number of bits for each of 2760 frames compressed by sampling 16,000 times for each second the same speech signal as the speech signal used in FIG. 17 using the EVS codec. In an embodiment of the disclosure, the UE may use 160, 144, and 56 bits per frame depending on characteristics of the speech signal, and transmit 0 bit (silence) when there is no speech activity and an SID frame for every 8 frames when there has been no speech activity for a long time. The 2760 frames shown in FIG. 22 includes 1305 160-bit frames, 702 144-bit frames, 493 56-bit frames, 40 SID frames, and 220 silence frames.

Referring to FIG. 22, a maximum bitrate of the compressed speech is 160/(20*0.001)=8.0 kbps, and an average bitrate is (160*1305+144*702+56*493+48*40)/(2760*20*0.001)=6.15 kbps. The average bitrate and the maximum bitrate has a big difference, so for the input signals and compression scheme that output the waveform shown in FIG. 22, it may be efficient for the gNB to control the average bitrate of the speech codec.

Comparing the waveforms shown in FIG. 21 with the waveforms shown in FIG. 22, it may be seen that various types of output waveforms may be obtained although the same speech signals are processed and compressed using the same codec. In various embodiments of the disclosure, codecs may be efficiently controlled in a network taking into account a difference in compression scheme between the codecs, output waveforms, and wireless communication conditions by using the M/A field.

In an embodiment of the disclosure, the UE may calculate a bitrate value based on a recommended bitrate MAC CE received from the gNB. When the M/A field has a value of 1, the UE may use the calculated bitrate as a maximum bitrate of a media codec for the transmission direction defined by the U/D field. Otherwise, when the M/A field has a value of 0, the UE may use the calculated bitrate as an average bitrate of a media codec for the transmission direction defined by the U/D field.

When the U/D field has a value of 1 (uplink), the UE applies the calculated bitrate to its own media codec. Otherwise when the U/D field has a value of 0 (downlink), the UE requests bitrate control from the other UE by transmitting a message such as TMMBR, CMR or the like to the other UE. When bitrate control for its own media codec has been completed or when the other UE responds with a message such as TMMBN, CMI or the like indicating that bitrate control has been done, the UE transmits to the gNB a recommended bitrate MAC CE reporting that the requested bitrate control has been completed, in operation S2041 of FIG. 20.

In this case, the recommended bitrate MAC CE transmitted from the UE has the same values as the recommended bitrate MAC CCE received from the gNB in the operation S2003 except for the R/A field value. Upon reception of the CE in the operation 2041, the gNB may confirm that a change in bitrate has been completed in response to the bitrate change request corresponding to the Request ID, based on the Request ID value of the received CE.

Figure 23:
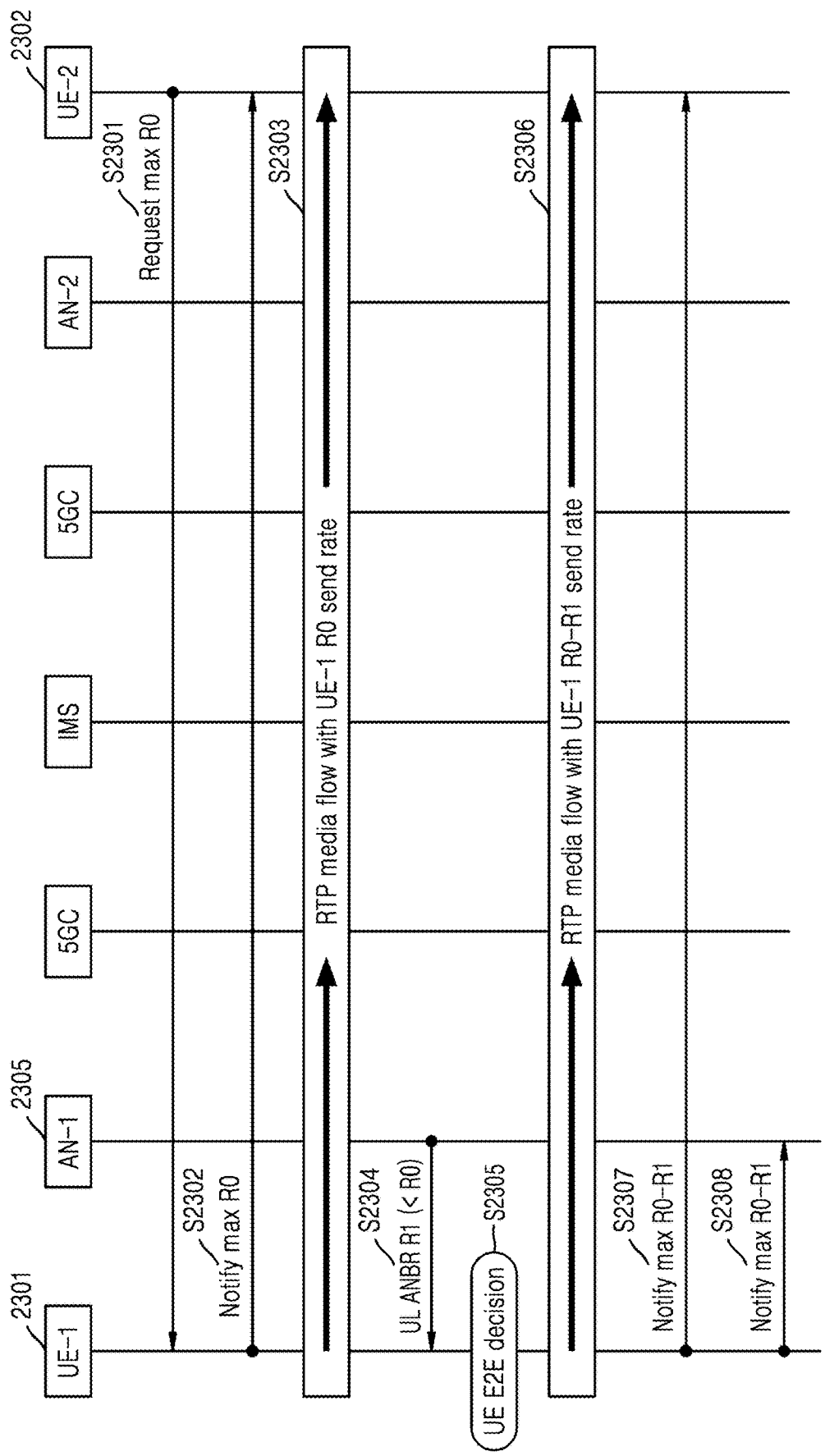
FIG. 23 is a sequence diagram illustrating a procedure of controlling bitrates in a 5G mobile communication system, according to an embodiment of the disclosure.

FIG. 23 shows a use case of a recommended bitrate MAC CE, according to an embodiment of the disclosure. While a first UE 2301 and a second UE 2302 are making a call between them, the second UE 2302 requests the first UE 2301 to use a bitrate of up to R0 kbps for media, in operation S2301. The first UE 2301 notifies the second UE 2302 to accept the request by using TMMBN or CMI, in operation S2302. The first UE 2301 applies the received R0 kbps to its codec to compress media and transmits the compressed media to the second UE 2302, in operation S2303.

Figure 26:
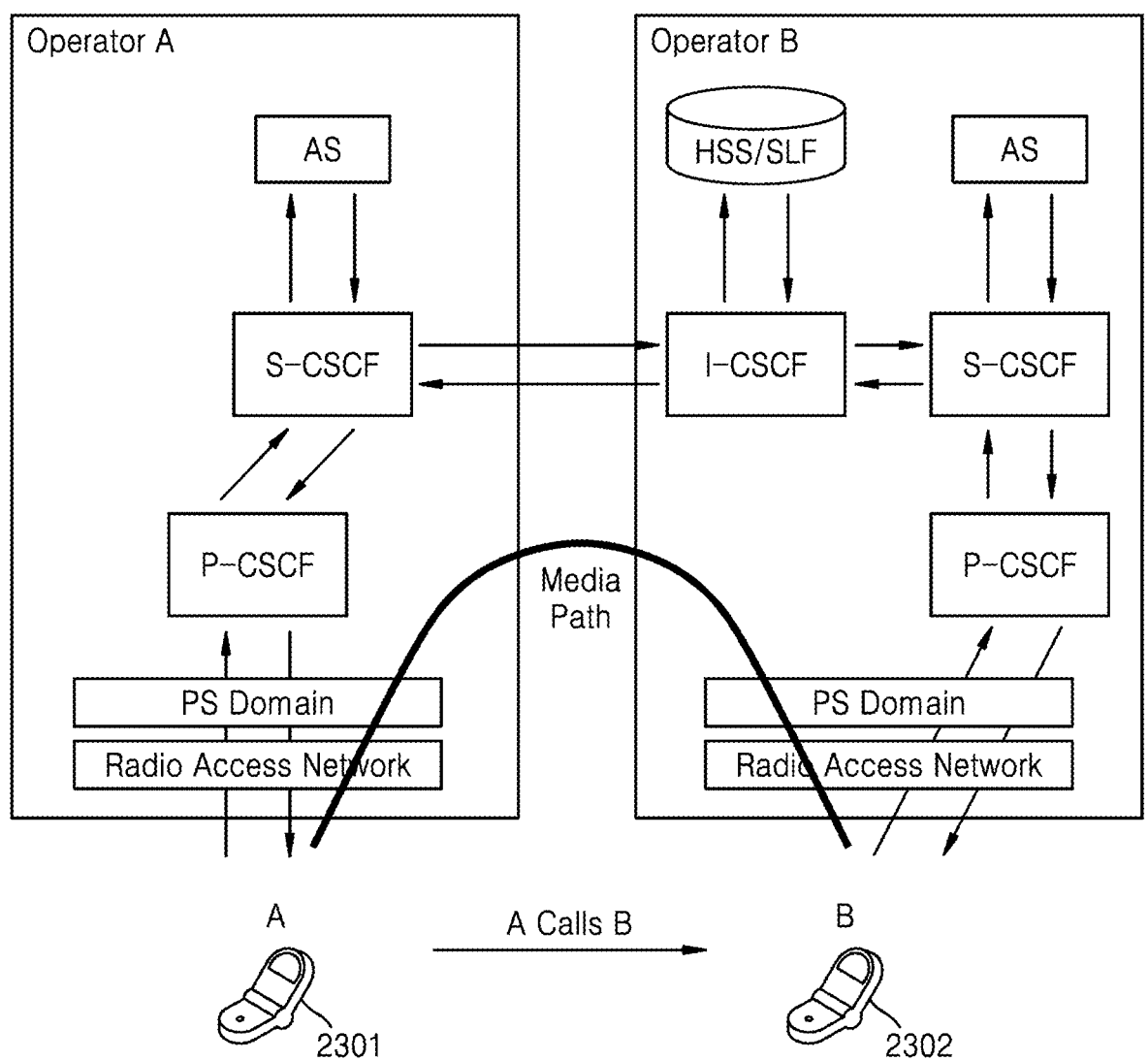
FIG. 26 illustrates an IP multimedia subsystem (IMS) used to negotiate or update a call condition.

In FIG. 23, an IMS for managing two core networks (5GCs) is located in the middle of the two 5GCs connected to the first UE 2301 and the second UE 2302, respectively. The IMS is, however, used only for negotiation or update of call conditions, as shown in FIG. 26. Hence, a media packet or an RTCP packet transmitted by the first UE 2301 is transmitted from a DN node, part of the 5GC of the first UE 2301, through an IP backbone network connecting the networks to the 5GC of the second UE 2302.

In FIG. 23, shown is a case that a transmission condition of a wireless communication network, i.e., an AN-1 2305, connected to the first UE 2301 gets worse and thus the AN-1 2305 has difficulty in maintaining R0 kbps provided for the uplink of the first UE 2301. To reduce the maximum bitrate of media compressed and transmitted by the first UE 2301 by R1 kbps, the AN-1 2305 sets the BR field, +/− field, M/A field, and U/D field of the recommended bitrate MAC CE to a value corresponding to R1, 1 (decrease), 1 (maximum), and 1 (uplink), respectively, and transmits the recommended bitrate MAC CE to the first UE 2301, in operation S2304. Upon reception of the recommended bitrate MAC control CE, the first UE 2301 determines to change the maximum bitrate to (R0-R1) kbps, in operation S2305.

To change the maximum bitrate to the (R0-R1) kbps, the procedure as described above in connection with FIGS. 18 and 20 may be used. The first UE 2301 applies the changed maximum bitrate (R0-R1) kbps to its codec to compress media, and transmits the compressed media, in operation S2306. The first UE 2301 notifies the second UE 2302 that the maximum bitrate has been changed to the (R0-R1) kbps by using a TMMBN or CMI message, in operation S2307.

The first UE 2301 also notifies that a change in bitrate requested by the AN-1 2305 has been completed by transmitting a recommended bitrate MAC CE to the AN-1 2305, in operation S2308.

Figure 24:
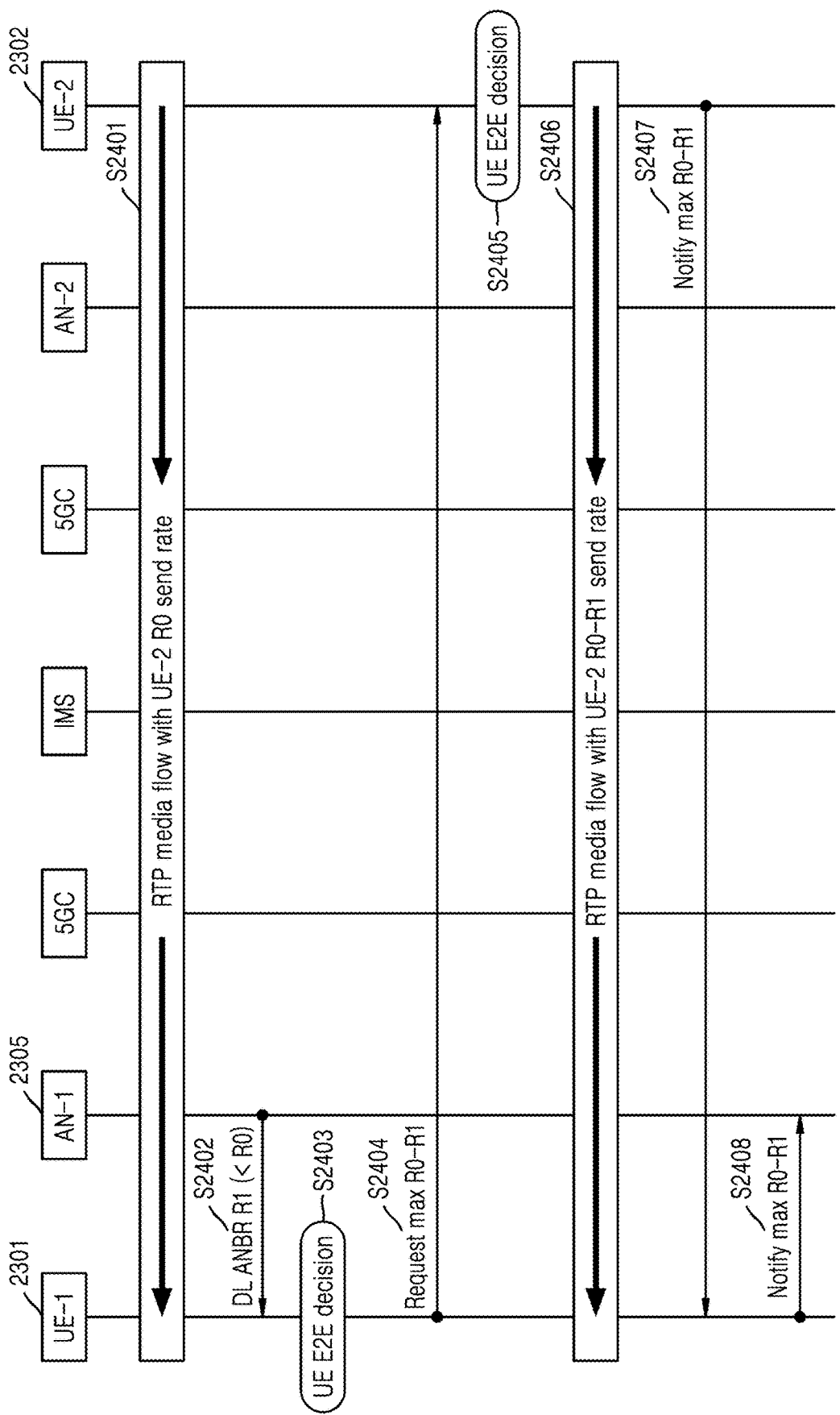
FIG. 24 is a sequence diagram illustrating a procedure of controlling a bitrate in a 5G mobile communication system, according to another embodiment of the disclosure.

FIG. 24 shows another use case of a recommended bitrate MAC CE, according to an embodiment of the disclosure.

In FIG. 24, shown is a case that media compressed at a bitrate of R0 kbps is transmitted from the second UE 2302 to the first UE 2301. The second UE 2302 compresses media at the bitrate of R0 kbps, and transmits the compressed media to the first UE 2301, in operation S2401.

To reduce the maximum media bitrate by R1 kbps, the AN-1 2305 connected to the first UE 2301 sets the BR field, +/− field, M/A field, and U/D field of the recommended bitrate MAC CE to a value corresponding to R1, 1 (decrease), 1 (maximum), and 0 (downlink), respectively, and transmits the recommended bitrate MAC CE to the first UE 2301, in operation S2402.

Upon reception of the recommended bitrate MAC control CE, the first UE 2301 determines to change the maximum bitrate to (R0-R1) kbps, in operation S2403.

To change the maximum bitrate to the (R0-R1) kbps, the procedure as described above in connection with FIGS. 18 and 20 may be used. The first UE 2301 transmits to the second UE 2302 a TMMBR or CMR message requesting to compress and transmit media by applying the changed maximum bitrate (R0-R1) kbps to a codec, in operation S2404. The second UE 2302 determines to reduce the bitrate to the requested (R0-R1) kbps, in operation S2405. The second UE 2302 compresses the media at the bitrate of (R0-R1) kbps, and transmits the compressed media to the first UE 2301, in operation S2406. After reducing the bitrate, the second UE 2302 notifies completion of the bitrate control requested from the first UE 2301 by transmitting a TMMBN or CMI message to the first UE 2301, in operation S2407. Upon reception of the TMMBN or CMI message from the second UE 2302, the first UE 2301 notifies the AN-1 2305 through a recommended bitrate MAC CE that bitrate reduction requested from the AN1 2305 has been completed, in operation S2408.

In the general technology, overheads added to media from the RTP/UDP/IP protocols of the UE and the PDCP/RLC/MAC/PHY protocols of the modem are calculated, and a value obtained by subtracting the calculated overheads from a bitrate defined by the BR field of the recommended bitrate MAC CE received from the gNB is applied to its own media codec or requested to be used by the other UE.

In this case, however, errors may occur in the procedure of calculating the overheads (BR_1, BR_2, BR_3, BR_4, BR_5, BR_6, and BR_7) added from various protocol layers as shown in FIG. 17, and may be accumulated, causing a different result from a bitrate control direction or range requested by the gNB to the UE. An error may also occur in a procedure in which the gNB calculates an absolute value of a bitrate currently used by the UE.

Hence, to diminish performance deterioration due to the errors, in an embodiment of the disclosure, the gNB calculates a relative value to be adjusted without calculating an absolute value of the bitrate currently used by the UE and transmits the relative value to the UE. The UE may apply the adjustment value of the bitrate requested from the gNB through the recommended bitrate MAC CE directly to its own media codec, or may request the other UE to apply the adjustment value of the bitrate to the codec of the other UE. In an embodiment of the disclosure in particular, the procedure of calculating the overheads of the RTP/UDP/IP/

PDCP/RLC/MAC/PHY protocols is omitted, thereby preventing occurrence and accumulation of errors.

Furthermore, in the general technology, as shown in FIGS. 11 and 16, the gNB is not able to check whether the bitrate control requested by the gNB to a particular UE has been completed. On the contrary, in an embodiment of the disclosure, the R/A field and the Request ID field are newly defined in the recommended bitrate MAC CE, enabling the UE to report the gNB that the requested control has been completed. Accordingly, in various embodiments of the disclosure, the gNB may support continuous bitrate control for each UE and enable efficient management over radio resources.

Furthermore, as compared with the general technology that supports only the maximum bitrate control, an embodiment of the disclosure enables an average bitrate to be controlled, thereby enabling variable bitrates of a media codec to be controlled.

Figure 27:
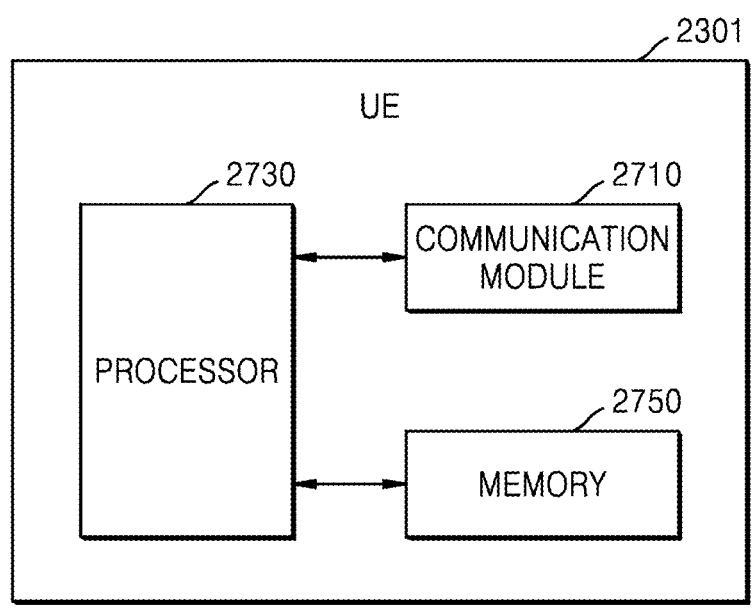
FIG. 27 is a block diagram of a UE, according to an embodiment of the disclosure.

FIG. 27 is a block diagram of the UE 2301, according to an embodiment of the disclosure.

Referring to FIG. 27, in an embodiment of the disclosure, the UE 2301 may include a communication module 2710, a processor 2730 and a memory 2750. However, the illustrated components are not all essential. The UE 2301 may be implemented by more or less components than illustrated in FIG. 27. In addition, the communication module 2710, the processor 2730, and the memory 2750 may be implemented in a single chip depending on implementation schemes.

The UE 2301 is a communication entity to which a communication service is provided. For example, the UE 2301 may include a smart phone, a wearable device, a tablet personal computer (tablet PC), a personal computer (PC), a smart television (smart TV), a personal digital assistant (PDA), a laptop, a media player, a micro server, a global positioning system (GPS), an electronic book (e-book) reader, a terminal for digital broadcasting, a navigation, an MP3 player, a digital camera, or the like, without being limited thereto. In addition to the aforementioned devices, the UE 2301 may be a mobile computing device or a non-mobile computing device.

The processor 2730 may include one or more processors or other processing devices that control the proposed function, processes, and/or methods proposed in the disclosure. Operation of the UE 2301 may be implemented by the processor 2730.

The communication module 2710 may be connected to the processor 2730 for transmitting and/or receiving a signal. The signal may include control information and data. In addition, the communication module 2710 may receive a signal through a wireless channel and output the signal to the processor 2730. The communication module 2710 may transmit a signal output from the processor 2730 through a wireless channel.

The memory 2750 may store the control information or the data included in the signal obtained by the UE 2301. The memory 2750 may be connected to the processor 2730 and may store at least one instruction or a protocol or a parameter for the proposed function, process, and/or method. The memory 2750 may include a read-only memory (ROM), a random access memory (RAM), a hard disk, a compact disc ROM (CD-ROM), a digital versatile disc (DVD), and/or other storage devices.

In an embodiment of the disclosure, the communication module 2710 of the UE 2301 may receive bitrate control information. The communication module 2710 of the UE 2301 may receive the bitrate control information from the BS 2305. For example, the UE 2301 may receive from a BS in a 5G mobile communication network, e.g., a gNB, a recommended bitrate MAC CE generated by the MAC protocol as the bitrate control information.

In an embodiment of the disclosure, the recommended bitrate MAC CE may include information about at least one of a logical channel identifier (LCID), a transmission direction of media data (U/D field), a bitrate value to be changed (BR field), whether to increase or decrease the bitrate (+/− field), which of the maximum bitrate and the average bitrate is to be change (M/A field), whether the recommended bitrate MAC CE is to request or indicate a change in bitrate (R/A field), or a CE identifier (Request ID).

The processor 2730 may change the bitrate by a value determined based on the bitrate control information.

In an embodiment of the disclosure, the processor 2730 may identify first information indicating a transmission direction of media data and second information indicating which of the maximum bitrate and the average bitrate is to be changed, from the bitrate control information. The processor 2730 may determine a bitrate to be changed, based on the first information and the second information.

For example, the processor 2730 may determine whether the transmission direction of the media data whose bitrate is controlled is an uplink or a downlink, based on the value of the U/D field included in a recommended bitrate MAC CE received from the gNB. The processor 2730 may determine which of the maximum bitrate and the average bitrate is to be changed, based on the value of the M/A field included in the recommended bitrate MAC CE received from the BS.

The processor 2730 may identify third information about a bitrate value to be changed and fourth information indicating whether to increase or decrease the bitrate, from the bitrate control information. The processor 2730 may determine a bitrate to be changed, based on the third information and the fourth information.

For example, the processor 2730 may determine to increase or decrease the current bitrate as much as indicated by the value of the BR field, based on the value of the +/− field included in the recommended bitrate MAC CE received from the BS.

For example, the processor 2730 may identify the transmission direction of the media data as an uplink based on the bitrate control information. For example, when the value of the U/D field included in the bitrate control information is 1, the processor 2730 may determine that the transmission direction of the media data is an uplink. In this case, the processor 2730 may apply the bitrate changed as much as the value determined based on the bitrate control information to its media codec.

In another example, the processor 2730 may identify the transmission direction of the media data as a downlink based on the bitrate control information. For example, when the value of the U/D field included in the bitrate control information is 0, the processor 2730 may determine that the transmission direction of the media data is a downlink. In this case, the processor 2730 may request the other UE to apply the bitrate changed as much as the value determined based on the bitrate control information to a codec of the other UE. In this case, the communication module 2710 may receive from the other UE information notifying that the bitrate has been changed.

Once the bitrate change has been completed, the processor 2730 may control the communication module 2710 to transmit the information notifying that the bitrate has been changed. In an embodiment of the disclosure, the processor 2730 may control the communication module 2710 to transmit to the BS 2305 the information notifying that the bitrate has been changed. The information that the UE 2301 notifies the BS 2305 that the bitrate has been changed may be a recommended bitrate MAC CE including the same identifier as that of the recommended bitrate MAC CE received from the BS 2305. The value of the R/A field of the recommended bitrate MAC CE that the UE 2301 notifies the BS 2305 that the bitrate has been changed may be 0. The value of the R/A field of the recommended bitrate MAC CE that the UE 2301 receives from the BS 2305 may be 1.

The UE 2301 may communicate with the other UE at the changed bitrate.

Figure 28:
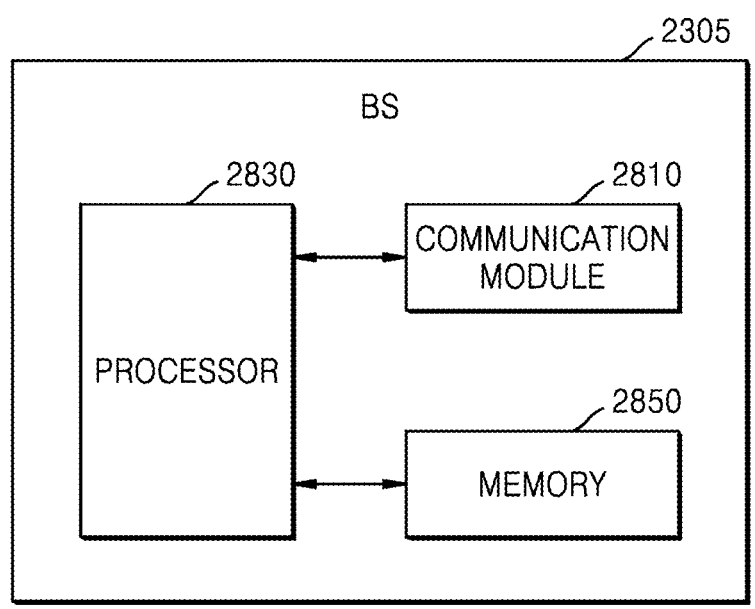
FIG. 28 is a block diagram of a base station, according to an embodiment of the disclosure.

FIG. 28 is a block diagram of the BS 2305, according to an embodiment of the disclosure. In the disclosure, an eNB or a gNB may correspond to the BS 2305.

Referring to FIG. 28, in an embodiment of the disclosure, the BS 2305 may include a communication module 2810, a processor 2830 and a memory 2850. The BS 2305 may be, however, implemented with more or fewer components than shown in FIG. 28.

Referring to FIG. 28, the BS 2305 may include a communication module 2810, a processor 2830, and a memory 2850. However, the illustrated components are not all essential. The BS 2305 may be implemented with more or less components than illustrated in FIG. 28. In addition, the communication module 2810, the processor 2830, and the memory 2850 may be implemented in a single chip depending on implementation schemes.

The processor 2830 may include one or more processors or other processing devices that control the proposed function, processes, and/or methods proposed in the disclosure. Operation of the BS 2305 may be implemented by the processor 2830.

The communication module 2810 may be connected to the processor 2830 for transmitting and/or receiving a signal. The signal may include control information and data. In addition, the communication module 2810 may receive a signal through a wireless channel and output the signal to the processor 2830. The communication module 2810 may transmit a signal output from the processor 2830 through a wireless channel.

The memory 2850 may store the control information or the data included in the signal obtained by the BS 2305. The memory 2850 may be connected to the processor 2830 and may store at least one instruction or a protocol or a parameter for the proposed function, process, and/or method.

The memory 2850 may include a ROM, a RAM, a hard disk, a CD-ROM, a DVD, and/or other storage devices.

In an embodiment of the disclosure, the processor 2830 of the BS 2305 may determine whether a change in bitrate is required based on a network load condition.

When it is determine that a change in bitrate is required, the processor 2830 may control the communication module 2810 to transmit to the UE 2301 bitrate control information requesting to change the bitrate by a certain value. For example, the BS 2305 may transmit a recommended bitrate MAC CE generated by the MAC protocol as the bitrate control information the UE 2301.

In an embodiment of the disclosure, the recommended bitrate MAC CE may include information about at least one of a logical channel identifier (LCID), a transmission direction of media data (U/D field), a bitrate value to be changed (BR field), whether to increase or decrease the bitrate (+/− field), which of the maximum bitrate and the average bitrate is to be change (M/A field), whether the recommended bitrate MAC CE is to request or indicate a change in bitrate (R/A field), or a CE identifier (Request ID).

In an embodiment of the disclosure, the UE 2301 may change the bitrate by a value determined based on the bitrate control information received from the BS 2305, and transmit to the BS 2305 information indicating that the bitrate has been changed.

The communication module 2810 of the BS 2305 may receive from the UE 2301 the second recommended bitrate MAC CE responding to the first recommended bitrate MAC CE transmitted to the UE 2301.

Embodiments of the disclosure may be implemented with a software program including instructions stored in a computer-readable storage medium.

The computer is a device capable of calling out instructions stored in the storage medium and operating under the instructions as in the embodiments of the disclosure, and may include a video transmitting apparatus and a video receiving apparatus according to the embodiments of the disclosure.

The computer- or machine-readable storage medium may be provided in the form of a non-transitory storage medium. The term 'non-transitory storage medium' may mean a tangible device without including a signal, e.g., electromagnetic waves, and may not distinguish between storing data in the storage medium semi-permanently and temporarily. For example, the non-transitory storage medium may include a buffer that temporarily stores data.

In an embodiment of the disclosure, the aforementioned method according to the various embodiments of the disclosure may be provided in a computer program product. The computer program product may be a commercial product that may be traded between a seller and a buyer.

The computer program product may be distributed in the form of a storage medium (e.g., a compact disc read only memory (CD-ROM)), through an application store (e.g., play store), directly between two user devices (e.g., smart phones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

In a system including a server and a UE (e.g., the video transmitting or receiving apparatus), the computer program product may include a storage medium of the server or a storage medium of the UE. Alternatively, when there is a third device (e.g., a smart phone) communicatively connected to the server or the UE, the computer program product may include a storage medium of the third device. In another example, the computer program product may be transferred from the server to the UE or the third party, or may include a software program itself that is transferred from the third device to the UE.

In this case, one of the server, the UE, and the third device may execute the computer program product to perform the method according to the embodiments of the disclosure. Alternatively, two or more of the server, the UE, and the third device may execute the computer program product to perform the method according to the embodiments of the disclosure in a distributed fashion.

For example, the server (e.g., a cloud server or an artificial intelligence (AI) server) may execute the computer program product stored therein to control the terminal communicatively connected to the server to perform the method according to the embodiments of the disclosure.

In yet another example, the third device may execute the computer program product to control the UE communicatively connected to the third device to perform the method according to the embodiments of the disclosure. In a specific example, the third device may remotely control the video transmitting or receiving apparatus to transmit or receive a packaged image.

In the case that the third device executes the computer program product, the third device may download the computer program product and execute the downloaded computer program product. Alternatively, the third device may execute the computer program product that has been preloaded to perform the method according to the embodiments of the disclosure.

The invention claimed is:

1. A method of controlling a bitrate of a user equipment (UE), the method comprising:
  receiving bitrate control information including a first recommended bitrate medium access control (MAC) control element (CE) from a base station (BS);
  changing a bitrate by a value determined based on the bitrate control information;
  transmitting, to the BS, information notifying that the bitrate has been changed; and
  communicating with another UE at the changed bitrate,
  wherein the information notifying that the bitrate has been changed includes a second recommended bitrate MAC CE including a same identifier as an identifier of the first recommended bitrate MAC CE, and
  wherein first recommended bitrate MAC CE and the second recommended bitrate MAC CE comprise information about whether the recommended bitrate MAC CE is to request or notify a change in bitrate.

2. The method of claim 1, wherein the bitrate control information comprises a first recommended bitrate media access control (MAC) control element (CE) generated by a MAC protocol of a 5th generation (5G) mobile communication system.

3. The method of claim 2, wherein the first recommended bitrate MAC CE comprises information about at least one of a logical channel identifier, a transmission direction of media data, a bitrate value to be changed, whether to increase or decrease the bitrate, which of a maximum bitrate and an average bitrate is to be changed, whether the first recommended bitrate MAC CE is to request or indicate a change in bitrate, or a CE identifier.

4. The method of claim 1, wherein the changing of the bitrate comprises:
  identifying first information indicating a transmission direction of media data and second information indicating which of a maximum bitrate and an average bitrate is to be changed, from the bitrate control information; and
  determining a bitrate to be changed based on the first information and the second information.

5. The method of claim 4, wherein the changing of the bitrate comprises:
  identifying third information about a bitrate value to be changed and fourth information indicating whether to increase or decrease the bitrate, from the bitrate control information; and
  changing the determined bitrate based on the third information and the fourth information.

6. The method of claim 1, wherein the changing of the bitrate comprises:
  identifying a transmission direction of media data as a downlink, from the bitrate control information;
  requesting the other UE to change a bitrate by a value determined based on the bitrate control information; and
  receiving, from the other UE, information notifying that the bitrate has been changed.

7. The method of claim 1, wherein the first recommended bitrate MAC CE is generated by a MAC protocol of a 5G mobile communication system.

8. The method of claim 1,
  wherein the first recommended bitrate MAC CE and the second recommended bitrate MAC CE comprise a request/acknowledge (R/A) field indicating the information about whether the recommended bitrate MAC CE is to request or notify a change in bitrate,
  wherein the R/A field of the first recommended bitrate MAC CE has a value of 1, and
  wherein the R/A field of the second recommended bitrate MAC CE has a value of 0.

9. A method of controlling a bitrate of a base station (BS), the method comprising:
  determining whether a change in bitrate is required, based on a network load condition;
  transmitting, to a user equipment (UE), bitrate control information including a first recommended bitrate medium access control (MAC) control element (CE), the bitrate control information requesting to change a bitrate by a certain value, based on a result of the determining; and
  receiving, from the UE, information notifying that the bitrate has been changed based on the bitrate control information,
  wherein the information notifying that the bitrate has been changed includes a second recommended bitrate MAC CE including a same identifier as an identifier of the first recommended bitrate MAC CE, and
  wherein first recommended bitrate MAC CE and the second recommended bitrate MAC CE comprise information about whether the recommended bitrate MAC CE is to request or notify a change in bitrate.

10. The method of claim 9, wherein the transmitting of the bitrate control information comprises:
  generating the bitrate control information to include information requesting to decrease the bitrate when the network is in an overload state; and
  generating the bitrate control information to include information requesting to increase the bitrate when the network has capacity.

11. The method of claim 9, wherein the bitrate control information comprises a first recommended bitrate media access control (MAC) control element (CE) generated by a MAC protocol of a 5th generation (5G) mobile communication system.

12. The method of claim 11, wherein the first recommended bitrate MAC CE comprises information about at least one of a logical channel identifier, a transmission direction of media data, a bitrate value to be changed, whether to increase or decrease the bitrate, which of a maximum bitrate and an average bitrate is to be changed, whether the first recommended bitrate MAC CE is to request or indicate a change in bitrate, or a CE identifier.

13. The method of claim 9, wherein the first recommended bitrate MAC CE is generated by a MAC protocol of a 5G mobile communication system.

14. The method of claim 9,
  wherein the first recommended bitrate MAC CE and the second recommended bitrate MAC CE comprise a request/acknowledge (R/A) field indicating the information about whether the recommended bitrate MAC CE is to request or notify a change in bitrate, wherein the R/A field of the first recommended bitrate MAC CE has a value of 1, and wherein the R/A field of the second recommended bitrate MAC CE has a value of 0.

15. A user equipment (UE) communicating with another UE over a mobile communication network, the UE comprising:

transceiver; and a processor coupled with the transceiver and configured to:

receive bitrate control information including a first recommended bitrate medium access control (MAC) control element (CE) from a base station (BS), change a bitrate by a value determined based on the bitrate control information, transmit, to the BS, information notifying that the bitrate has been changed, and communicate with another UE at the changed bitrate, wherein the information notifying that the bitrate has been changed includes a second recommended bitrate MAC CE including a same identifier as an identifier of the first recommended bitrate MAC CE, and wherein first recommended bitrate MAC CE and the second recommended bitrate MAC CE comprise information about whether the recommended bitrate MAC CE is to request or notify a change in bitrate.

16. The UE of claim 15, wherein the bitrate control information comprises a first recommended bitrate media access control (MAC) control element (CE) generated by a MAC protocol of a 5th generation (5G) mobile communication system.

17. The UE of claim 16, wherein the first recommended bitrate MAC CE comprises information about at least one of a logical channel identifier, a transmission direction of media data, a bitrate value to be changed, whether to increase or decrease the bitrate, which of a maximum bitrate and an average bitrate is to be changed, whether the first recommended bitrate MAC CE is to request or indicate a change in bitrate, or a CE identifier.

18. The UE of claim 15, wherein the processor is further configured to:

identify first information indicating a transmission direction of media data and second information indicating which of a maximum bitrate and an average bitrate is to be changed, from the bitrate control information, and determine a bitrate to be changed based on the first information and the second information.

19. The UE of claim 15, wherein the processor is further configured to:

identify third information about a bitrate value to be changed and fourth information indicating whether to increase or decrease the bitrate, from the bitrate control information, and change the determined bitrate based on the third information and the fourth information.

20. The UE of claim 15, wherein the processor is further configured to:

identify a transmission direction of media data as a downlink, from the bitrate control information, request the other UE to change a bitrate by a value determined based on the bitrate control information, and receive, from the other UE, information notifying that the bitrate has been changed.

* * * * *